(12) United States Patent
Brown

(10) Patent No.: US 11,134,221 B1
(45) Date of Patent: Sep. 28, 2021

(54) AUTOMATED SYSTEM AND METHOD FOR DETECTING, IDENTIFYING AND TRACKING WILDLIFE

(71) Applicant: Daniel Brown, Durhamville, NY (US)

(72) Inventor: Daniel Brown, Durhamville, NY (US)

(*) Notice: Subject to any disclaimer, the term of this patent is extended or adjusted under 35 U.S.C. 154(b) by 0 days.

(21) Appl. No.: 15/819,713

(22) Filed: Nov. 21, 2017

(51) Int. Cl.
| | |
|---|---|
| *H04N 7/18* | (2006.01) |
| *G01S 19/42* | (2010.01) |
| *H04N 5/262* | (2006.01) |
| *H04W 4/80* | (2018.01) |
| *G06F 3/0484* | (2013.01) |
| *G01C 21/16* | (2006.01) |
| *G06F 16/29* | (2019.01) |

(52) U.S. Cl.
CPC ............ *H04N 7/181* (2013.01); *G01S 19/42* (2013.01); *H04N 5/2621* (2013.01); *H04N 7/188* (2013.01); *G01C 21/16* (2013.01); *G06F 3/0484* (2013.01); *G06F 16/29* (2019.01); *H04W 4/80* (2018.02)

(58) Field of Classification Search
CPC ...... H04N 7/181; H04N 5/2621; H04N 7/188; G01S 19/42; H04W 4/80; G06F 16/29; G06F 3/0484; G01C 21/16
USPC ......................................................... 348/159
See application file for complete search history.

(56) References Cited

U.S. PATENT DOCUMENTS

| | | |
|---|---|---|
| 5,633,678 A | 5/1997 | Parulski et al. |
| 6,363,161 B2 | 3/2002 | Laumeyer et al. |
| 6,912,602 B2 | 6/2005 | Soga |
| 6,977,679 B2 | 12/2005 | Tretter et al. |
| 8,391,618 B1 | 3/2013 | Chuang et al. |
| 8,447,119 B2 | 5/2013 | Yu |
| 8,600,118 B2 | 12/2013 | Cuddeback |
| 9,070,188 B2 | 6/2015 | Cuddeback |
| 9,104,966 B2 | 8/2015 | McVey |
| 9,527,115 B2 | 12/2016 | LaRose et al. |
| 2004/0107104 A1* | 6/2004 | Schaphorst ........... G10L 15/183 704/270 |

(Continued)

OTHER PUBLICATIONS

Depu Zhou, "Real-time Animal Detection System for Intelligent Vehicles", Master Thesis, School of Electrical Engineering and Computer Science, Faculty of Engineering, University of Ottawa, 2014 (Year: 2014).*

*Primary Examiner* — Ayman A Abaza
(74) *Attorney, Agent, or Firm* — Woods Oviatt Gilman LLP; Dennis B. Danella, Esq.

(57) ABSTRACT

A system for autonomously photographing wildlife includes a camera apparatus, camera mount and actuating unit. The camera apparatus records video data may include a camera, a memory and a processing system which includes a processor and an image analysis module including computer executable instructions stored in the memory. The image analysis module receives a video data file; performs an image analysis of discrete portions of the video data file; detects motion within each respective discrete portion; determines whether the detected motion is caused by an animal; calculates an outline for the animal; and stores a selected discrete portion of the video data file in the memory. The selected discrete portion includes an outline of the animal. The camera mount receives the camera thereon and the actuating unit couples the camera to the camera mount and is actuatable to tilt and/or pan the camera.

31 Claims, 17 Drawing Sheets

(56) References Cited

U.S. PATENT DOCUMENTS

| | | |
|---|---|---|
| 2005/0212912 A1* | 9/2005 | Huster .................. H04N 7/188 |
| | | 348/155 |
| 2007/0035627 A1* | 2/2007 | Cleary ............. G08B 13/19608 |
| | | 348/159 |
| 2007/0188626 A1 | 8/2007 | Squilla et al. |
| 2015/0131868 A1 | 5/2015 | Rooyakkers et al. |
| 2016/0026895 A1* | 1/2016 | Huffman ................ H04N 7/181 |
| | | 382/110 |
| 2016/0214533 A1 | 7/2016 | Doyle et al. |
| 2016/0284095 A1 | 9/2016 | Chalom et al. |
| 2017/0154241 A1 | 6/2017 | Shambik et al. |
| 2019/0132510 A1* | 5/2019 | Beach ................ H04N 5/23258 |

* cited by examiner

AUTOMATED SYSTEM AND METHOD FOR DETECTING, IDENTIFYING AND TRACKING WILDLIFE

FIELD OF THE INVENTION

The present invention relates to an automated system and method for detecting, identifying and tracking wildlife, and more particularly to a system and method of recording wildlife through continuous full motion video and/or audio capture, and still more particularly to a system and method employing computer vision algorithms and object detection machine learning algorithms to detect, identify and track wildlife during continuous full motion video and/or audio capture.

BACKGROUND OF THE INVENTION

Traditional trail cameras used by hunters and sportsman have motion sensors which trigger the camera to record an image or video. These motion sensors limit the effective range of the trail camera system to the sensitivity and detection limit of the motion sensors, which is typically less than 100 feet. Traditional trail cameras are also set up in a specific location and have fixed, limited field of view based on the lens of the camera, typically in the 30 degree to 60 degree range. When motion is detected in front of the camera, the system triggers the camera to snap a photograph or record a video clip, collectively an "image". Traditional trail cameras then save every image that is captured to the camera's memory. This can quickly fill the memory with unwanted images, such as tree branches moving in the wind, a random bird that flies in front of the camera or non-target animals such as livestock and horses. Moreover, these trail cameras do not actively search for wildlife but only passively photograph animals that trigger the motion sensor. Traditional cameras also do not identify or classify objects in the captured images.

Also, while traditional trail cameras have technology to transmit images over cellular networks and wireless local networks, any and all images captured are transmitted regardless of the contents of those images. As discussed above, these images may be "false alarm images" of tree branches moving, birds flying past the motion sensor or non-target animals (e.g. a chipmunk or squirrel when looking to capture deer). As a result, the receiving device will store these false alarm images and thereby use up valuable storage space. Another drawback of traditional trail cameras is that they use global positioning systems (GPS) to tag the specific location of the camera in the images and not the location of the animal within the image. Given that the detection limit of the motion sensor is limited, the GPS location of the camera is often indicative of the general location of an animal. Thus, to cover a large expanse, hunters and sportsman must deploy a platoon of trail cameras, with each camera responsible for only a portion of the expanse. However, thorough coverage of a large expanse may be cost prohibitive due to the cost of multiple cameras and associated equipment and may result in hundreds, if not thousands of unwanted false alarm images which must be individually scanned by the hunter or sportsman to verify whether an animal of interest is present in the image or not.

Thus, there is a need for a trail camera system and method enabling long range, high field of view, continuous full motion video capture of wildlife. There is a further need for a trail camera system and method that identifies and classifies animals within the video, as well as stores and transmits only those images with target animals. The present invention addresses these as well as other needs.

BRIEF SUMMARY OF THE INVENTION

It is, therefore, an aspect of the present invention to provide a system for autonomously photographing wildlife including a camera configured to capture video data. A memory is configured for receiving the video data from the camera and storing the video data in a video data file. A processor for facilitates image analysis of the captured video data in the video data file through an image analysis module stored in the memory. The image analysis module may include computer executable instructions stored in the memory. The image analysis module may utilize the processor to perform the steps of: receiving the captured video data file; performing an image analysis of one or more discrete portions of the captured video data in the video data file; detecting one or more animals within at least one or more discrete portions of the captured video data in the video data file; providing an outline for each of the one or more detected animals; and storing a selected discrete portion of the video data file in the memory, wherein the selected discrete portion includes at least one respective outline of the detected one or more animals.

In a further aspect of the present invention, the camera mount may be configured to receive the camera thereon and the actuating unit may couple the camera to the camera mount. The actuating unit may be selectively actuatable to tilt and/or pan the camera relative to the ground.

In yet a further aspect of the present invention, the computer executable instructions may include at least one of computer vision algorithms and object detection machine learning algorithms configured to detect the one or more animals.

In still another aspect of the present invention, the image analysis module may utilize the processor to perform the additional steps of calculating an animal location for the outline for each of the one or more animals and tagging the selected discrete portion of the video data file with global positioning satellite metadata for each calculated animal location. The image analysis module may further utilize the processor to perform the additional steps of identifying a species and/or a sex for each of the one or more animals and tagging the selected discrete portion of the video data file with the identified species and/or the sex for each of the one or more animals.

In yet another aspect of the present invention, the camera system may include a user interface module that is configured to receive a camera location including camera global positioning system data and a camera focal length. The memory may further include a look-up table comprising average animal size data for a plurality of animal species. The processor may then be configured for calculating a size of the animal outline for each of the one or more animals; comparing the calculated size of the respective animal outline with the look-up table size data for the identified species; and calculating a distance of the respective animal outline from the camera location, wherein the distance is converted to the global positioning satellite metadata. The step of calculating a location of each of the one or more animals may further comprise receiving a camera azimuth angle and/or a camera elevation angle from the actuating unit prior to calculating a distance of the respective animal outline from the camera location. The camera azimuth angle and/or a camera elevation angle may be used to calculate the location of each of the one or more animals.

In a further aspect of the present invention, the processor may be configured to display an aerial map identifying the camera location and the global positioning satellite metadata for each calculated animal location and associate the identified species and/or sex for each of the one or more animals with its respective global positioning satellite metadata. The processor may be further configured to display one or more of the selected discrete portion of the video; each respective animal outline for each of the one or more animals; the calculated size of each respective animal outline; the calculated distance of each respective animal outline from the camera location; the camera azimuth angle; and the camera elevation angle.

In still another aspect of the present invention, the processor may include one or more of a central processing unit, a graphics processing unit, a field programmable gate array or neuromorphic hardware. The camera system may further include an accelerometer configured to measure an amount of camera tilt and/or an amount of camera pan. The camera system may further comprise a thermometer wherein the selected discrete portion of the video data file may be tagged to include temperature data determined by the thermometer. The camera may an optical camera and/or a thermal camera and/or a hypospectral camera. The camera apparatus may further include a wind sensor configured to monitor wind speed and or wind direction. The selected discrete portion of the video data file may then be tagged to include wind speed and/or wind direction data determined by the wind sensor. The animal outline may be calculated as a bounded region, such as but not limited to a bounded box, circle, triangle or other polygon, or as an image segmentation.

In a further aspect of the present invention, the camera system may also be in communication with a remote computing device through a network. In one aspect of the present invention, the camera system may further comprise a user interface module wherein the memory, processor and the image analysis module are disposed in a remote computing device. The remote computing device is in communication with the camera system over a network wherein the memory is configured to store the selected discrete portion of the video data file received from the camera over the network. The image analysis module may utilize the processor to calculate an animal location for each of the animal outlines, tag the selected discrete portion of the video data file with global positioning satellite metadata for each calculated animal location, identify a species and/or a sex for each of the detected one or more animals and tag the selected discrete portion of the video data file with the identified species and/or sex for each of the detected one or more animals. The user interface module may also be configured to receive a camera location, display an aerial map identifying the camera location and the global positioning satellite metadata for each calculated animal location, and associate the identified species and/or sex for each of the one or more animals with its respective global positioning satellite metadata. The user interface module, utilizing the processor, may be further configured to display one or more of the selected discrete portion of the video data file; each respective animal outline for each of the detected one or more animals; a calculated size of each respective animal outline; and a calculated distance of each respective animal outline from the camera location.

In still another aspect of the present invention, the camera system may include a microphone configured to capture audio data. The memory may further include a look-up table comprising animal sound data for a plurality of animal species and sexes. The processing system may further comprise an audio analysis module including computer executable instructions stored in the memory. The audio analysis module may utilize the processor to receive the captured audio file from the microphone; store the captured audio data in the memory as a sound data file; perform an audio analysis of one or more discrete portions of the sound data file; detect at least one sound within each respective discrete portion of the video data file; compare the at least one detected sound with the animal sound data in the look-up table to determine whether the detected sound is a detected animal sound; and store a selected discrete portion of the sound data file in the memory wherein the selected discrete portion includes at least one detected animal sound. The audio analysis module may also utilize the processor to perform the additional steps of identifying a species and/or a sex of the animal as determined by the detected animal sound; and tagging the selected discrete portion of the sound data file with the identified species and/or sex. The microphone may be a directional microphone or an omnidirectional microphone.

A further aspect of the present invention is to provide a system for autonomously photographing wildlife comprising a camera system and a remote computing system. The camera system may include a camera configured to capture video data. A first memory may be configured for receiving the video data from the camera and storing the video data in a video data file. A first processor may facilitate image analysis of the captured video data in the video data file and a first image analysis module may be stored in the first memory, The first image analysis module may include computer executable instructions stored in the first memory. The first image analysis module may utilize the first processor to perform the steps of: receiving the captured video data file; performing an image analysis of one or more discrete portions of the captured video data in the video data file; and detecting one or more animals within at least one of the one or more discrete portions of the captured video data in the video data file. The remote computing system may be in communication with the camera system over a network. The remote computing system may comprise a second memory configured for storing the one or more discrete portions of the captured video data in the video data file including the detected one or more animals communicated from the camera system, a second processor and a second image analysis module stored in the second memory. The second image analysis module may include computer executable instructions stored in the second memory. The second image analysis module may utilize the second processor to perform the steps of: providing an outline for each of the one or more detected animals included in the one or more discrete portions of the captured video data in the video data file; and storing a selected discrete portion of the video data file in the second memory, wherein the selected discrete portion includes at least one respective outline of the detected one or more animals.

Still another aspect of the present invention is to provide a method for autonomously photographing wildlife using a camera system configured to continuously record video data. The camera system includes a camera, a memory, a processor, and an image analysis module including computer executable instructions stored in the memory. The method, utilizing the processor, comprises the steps of: providing video data from the camera; storing the video data in the memory as a video data file; performing an image analysis of one or more discrete portions of the video data file utilizing the image analysis module; detecting one or more animals within one or more discrete portions of the video data file; determining an outline for each of the one or more detected animals; and storing a selected discrete portion of the video data file in the memory, wherein the selected discrete portion includes at least one respective outline of the one or more detected animals. The computer executable instructions may include one or both of computer vision algorithms and object detection machine learning algorithms configured to detect the one or more animals.

In a further aspect of the present invention, the method may further include the steps of calculating an animal location for each of the respective animal outlines and tagging the selected discrete portion of the video data file with global positioning satellite metadata for each calculated animal location. Still further, the method may include the steps of identifying a species and/or a sex for each of the one or more detected animals and tagging the selected discrete portion of the video data file with the identified species and/or sex for each of the one or more detected animals. The memory may further include a look-up table comprising average animal size data for a plurality of animal species. The step of calculating a location of each of the one or more detected animals may comprise receiving, via a user interface module, a camera location including camera global positioning system data; receiving, via the user interface module, a camera focal length; calculating a size of a respective animal outline using the processor; comparing the calculated size of the respective animal outline with the look-up table size data for the identified species using the processor; and calculating a distance of the respective animal outline from the camera location, wherein the distance is converted to the global positioning satellite metadata.

In still another aspect of the present invention, the camera system may include an actuating unit coupled to the camera and actuable to tilt and/or pan the camera. The step of calculating a location of each of the one or more detected animals may further comprise receiving a camera azimuth angle and/or a camera elevation angle from the actuating unit prior to calculating a distance of the respective animal outline from the camera location. The method may further include the steps of displaying an aerial map identifying the camera location and the global positioning satellite metadata for each calculated animal location and associating the identified species and/or sex for each of the one or more detected animals with its respective global positioning satellite metadata. The user interface module, utilizing the processor, is further configured to display one or more of the selected discrete portion of the video data file; each respective animal outline for each of the one or more detected animals; the calculated size of each respective animal outline; the calculated distance of each respective animal outline from the camera location; the camera azimuth angle; and the camera elevation angle.

In a further aspect of the present invention, the method may further include the step of communicating with a remote computing device through a network wherein the remote computing device includes a memory, a user interface module, a processor, and an image analysis module. The memory of the remote computing device may be configured to store the selected discrete portion of the video data file received from the camera system through the network. The image analysis module of the remote computing device utilizes the processor of the remote computing device to calculate an animal location for each of the animal outlines, tag the selected discrete portion of the video data file with global positioning satellite metadata for each calculated animal location, identify a species and/or a sex for each of the one or more detected animals and tag the selected discrete portion of the video data file with the identified species and/or sex for each of the one or more detected animals. The user interface module of the remote computing device is configured to receive a camera location, display an aerial map identifying the camera location and the global positioning satellite metadata for each calculated animal location, and associate the identified species and/or sex for each of the one or more detected animals with its respective global positioning satellite metadata. The user interface module of the remote computing device, utilizing the processor of the remote computing device, may be further configured to display one or more of the selected discrete portion of the video data file; each respective animal outline for each of the one or more detected animals; a calculated size of each respective animal outline; and a calculated distance of each respective animal outline from the camera location.

In yet another aspect of the present invention, the camera system may further include a microphone configured to continuously record audio data. The memory may further include a look-up table comprising animal sound data for a plurality of animal species and sexes. An audio analysis module including computer executable instructions may be stored in the memory. The method, via the audio analysis module utilizing the processor, may further include the steps of receiving a sound data file; performing an audio analysis of one or more discrete portions of the sound data file; detecting at least one sound within each respective discrete portion of the video data file; comparing the detected at least one sound with the look-up table animal sound data to determine whether the detected at least one sound is a detected animal sound; and storing a selected discrete portion of the sound data file in the memory, wherein the selected discrete portion includes at least one detected animal sound. The method may further include the steps of identifying, via the audio analysis module utilizing the processor, a species and/or a sex of the animal as determined by the detected animal sound; and tagging the selected discrete portion of the sound data file with the identified species and/or sex. The microphone may be a directional microphone or an omnidirectional microphone.

Additional aspects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
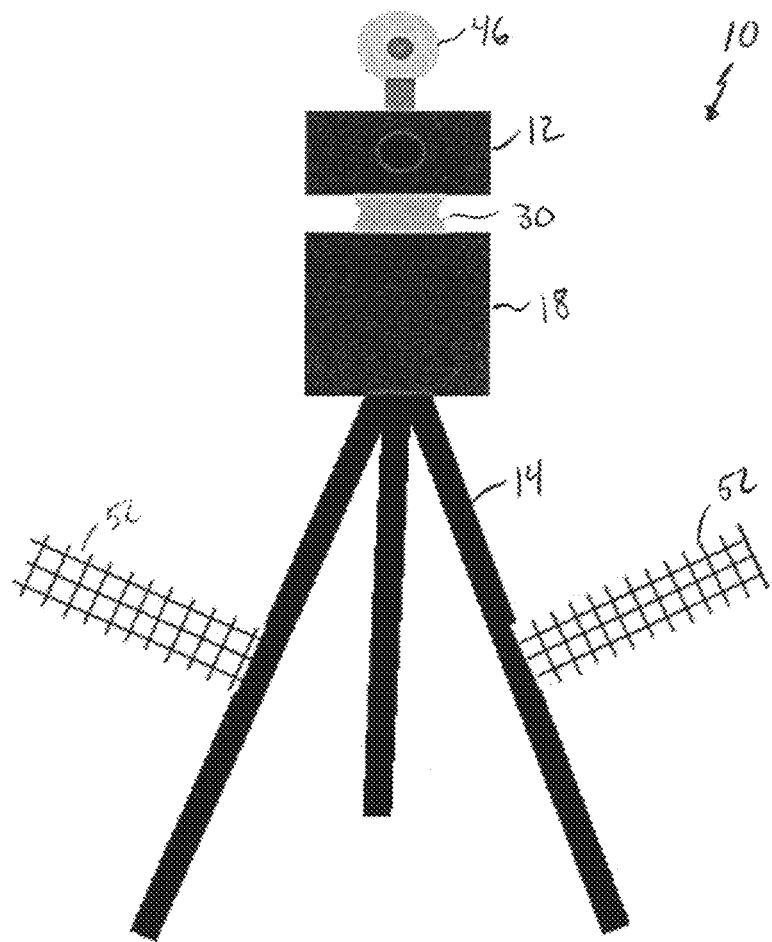
FIG. 1 is an exemplary elevational view of a trail camera system in accordance with an aspect of the present invention.
Figure 2:
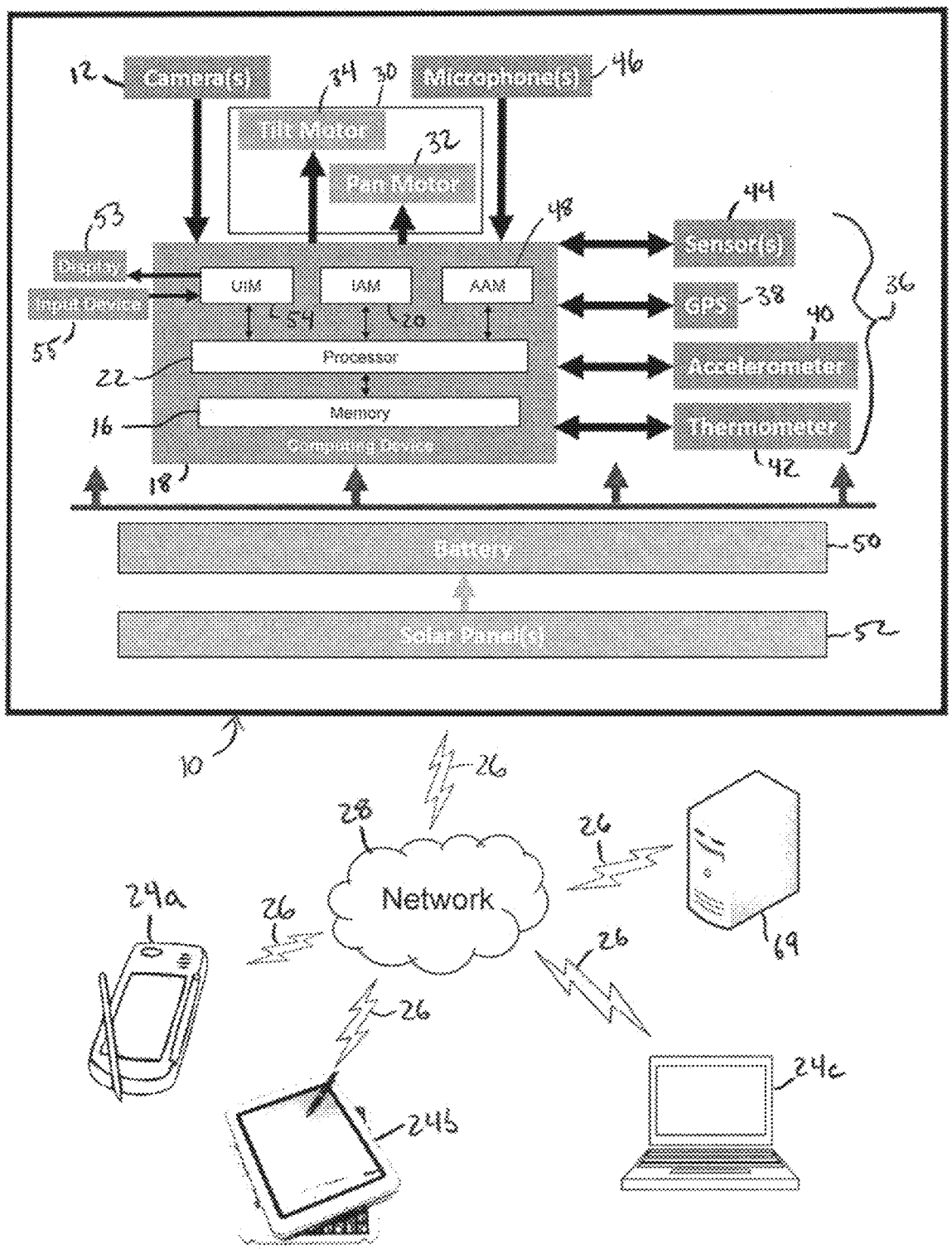
FIG. 2 is a schematic diagram showing an exemplary computer network that may be used within the trail camera system shown in FIG. 1.

Generally, the tools and methods described herein for identifying, tracking and recording wildlife may be implemented in hardware, software or a combination thereof. Referring to the drawings in detail, and specifically with reference to FIGS. 1-3, reference numeral 10 generally designates an exemplary trail camera system that may be used to implement at least a portion of the present invention. Trail camera system 10 may generally include a camera 12 mounted onto an optional camera mount 14, such as a tripod, tree or other suitable structure. Camera 12 may be any type of digital camera, such as but not limited to, an optical camera, a thermal camera, and/or a hypospectral camera. In accordance with an aspect of the present invention, camera system 10 may be configured to be placed outdoors so as to monitor wildlife within a selected geographic area, such as an open field and/or a wooded area, as will be discussed in greater detail below. To that end, camera 12 may be configured to continuously record full motion video and/or capture still-frame photographs while scanning the selected geographic area. The full motion video data and/or still-frame photographs may be stored within an onboard memory within camera 12 or may be stored within a memory 16 within a dedicated computing device 18. For sake of clarity, the remaining discussion of camera system 10 will reference computing device 18 as a separate unit from camera 12. However, one skilled in the art should recognize that computing device 18 may be a hardware component housed within camera 12.

To manage the large volume of video data being recorded by camera 12 and stored within memory 16, computing device 18 may include an image analysis module 20 which may include computer executable instructions stored in memory 16. Image analysis module 20 may utilize a processor 22 to provide video data management, such as through the use of computer vision algorithms and object detection machine learning algorithms, as will be discussed in greater detail below. Processor 22 may include, without limitation thereto, one or more of a central processing unit (CPU), graphics processing unit (GPU), a field programmable gate array (FPGA) or neuromorphic hardware.

Image analysis module 20 is configured to receive a video data file containing recorded video data acquired by camera 12. As used herein, the term "video data file" may encompass raw video data streaming directly from camera 12 whereby the raw video feed is either processed in real time and selectively stored in memory 16, or the video data is written to one or more files in memory 16 such that those files may be subsequently processed. Transfer of the video data file may be through wired or wireless connectivity between camera 12 and computing device 18. Image analysis module 20 may then segregate the video data file into discrete video portions, such as single digital images. Image analysis module 20 may then utilize processor 22 and the computer vision algorithms and object detection machine learning algorithms stored within memory 16 to interrogate the individual images within each discrete video portion to detect one or more animals or detect motion of one or more animals within collective frames or between temporally adjacent video portions. The object detection machine learning algorithms may then determine if any detected motion is due to movement of an animal or whether such movement was due to a generic environmental instance, such as movement of a tree or tree branches.

Figure 3A:
FIG. 3A is an exemplary screen shot of a digital image containing a bounded box outline in accordance with an aspect of the present invention.
Figure 3B:
FIG. 3B is an exemplary screen shot of a digital image containing an image segmentation outline in accordance with another aspect of the present invention.

In a further aspect of the present invention, and as will be discussed in greater detail below, image analysis module 20 may filter the images, via processor 22 and the object detection machine learning algorithm stored in memory 16, to detect only user-specified animal species, such as, for example, deer and/or turkeys. Once one or more animals have been detected, or movement due to one or more animals (or a specified animal species) has been detected, processor 22 may then instruct image analysis module 20 to identify an outline for each animal within the digital image. As shown in FIGS. 3A and 3B, image analysis module 20 may, for example, perform a bounded region calculation and highlight a bounded region, such as a bounded box region 21, or may employ an image segmentation algorithm to highlight an animal segmentation 23 within the digital image. To conserve memory and reduce the number of unwanted false alarm images, only those images which contain a pre-identified animal outline (and therefore, a detected animal) may be stored as selected discrete portions of video data within memory 16 and/or be communicated 26 to a remote computing device, such as but not limited to, a smart phone 24a, tablet 24b or computer 24c. Data communication 26, including selected discrete portions of the video data, may be through any suitable means, such as but not limited to, wireless communication over a network 28.

Figure 4:
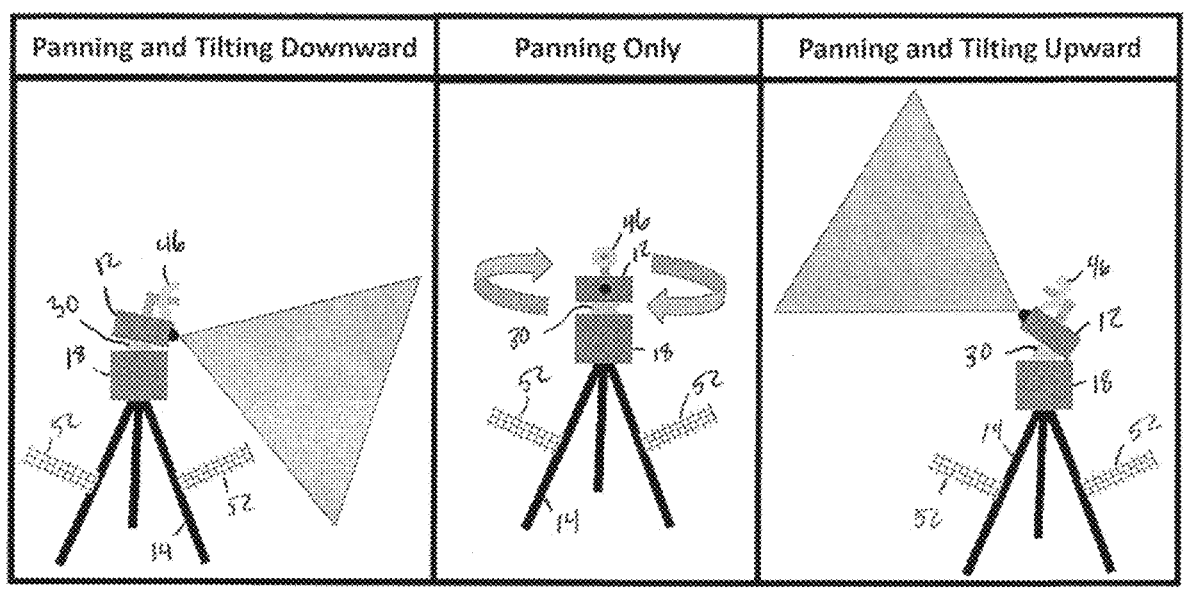
FIG. 4 is a series of exemplary elevational views of the trail camera system shown in FIG. 1 showing the camera utilizing tilt and/or pan functionality.

To facilitate scanning for wildlife within the selected geographic area (i.e., an open field and/or a wooded area), camera system 10 may also include an actuating unit 30 coupling camera 12 to camera mount 14. By way of example and without limitation thereto, actuating unit 30 may comprise a combination pan/tilt unit. Actuating unit 30, utilizing processor 22, may be configured to selective power a pan motor 32 and/or tilt motor 34 to cause camera 12 to pan and/or tilt so as to scan the selected geographic area. In this regard, panning is rotation of camera 12 along a plane generally parallel to the ground, while tilting is pivoting of camera 12 generally perpendicular to the ground. In this manner, and with reference to FIG. 4, camera 12 may swivel left or right through panning, or up and down through tilting, or may be swiveled to any desired angle by simultaneously panning and tilting through concurrent actuation of both pan motor 32 and tilt motor 34. Panning and/or tilting may be actuated at a constant rate or may be selectively controlled, such as to maintain detection of a select animal within the camera's field of view. As a result, in accordance with an aspect of the present invention, a single camera 12 may be deployed and be able to monitor a large expanse, including wildlife located both in the air and on the ground, while also selectively scanning for and identifying only user-specified targets. It should be understood by those skilled in the art that pan motor 32 and/or tilt motor 34 are not required components for animal detection and classification, or, if provided, they may be unpowered such that camera 12 may operate as a stationary camera having a fixed field of view similar to traditional field cameras utilizing motion sensors.

Camera system 10 may also include a sensor suite 36 comprising one or more sensor units, depending upon user needs or desires. For instance, camera system 10 may include a global positioning system (GPS) sensor 38 that is configured to determine the GPS location (latitude, longitude, compass heading) of camera 12 and communicate such data to computing device 18. The GPS (and camera) location metadata may then be included within each video data file. Moreover, as will be discussed in greater detail below, computing device 18 may calculate animal location(s) within the field of view of camera 12 utilizing processor 22 and the computer executable instructions stored within memory 16 based in part upon the known location of camera 12. Further, camera system 10 may also include an accelerometer 40 that is configured to monitor the position of actuating unit 30. That is, accelerometer 40 may measure the degree of pan and/or tilt of camera 12 so as to track the frame of view of camera 12. The camera frame of view may then be correlated with the GPS data so as to properly map animal location(s) on a virtual map, as will be discussed below. A thermometer 42 may also be included whereby temperature metadata may be included within the video data file. Additional and other sensors 44 may also be included within camera system 10 as needed or desired. By way of example, and without limitation thereto, sensor 44 may include a wind speed and/or wind direction sensor, such as a vane anemometer, whereby wind speed and/or wind direction metadata may be included within the video data file.

In accordance with an aspect of the present invention, camera system 10 may further include a microphone 46 configured to record audio data. Microphone 46 may be a directional or omnidirectional microphone according to user needs and availability. Microphone 46 may be used independently of camera 12, but in accordance with an aspect of the present invention, may be used in conjunction with camera 12 so as to enable camera system 10 to gather more situational awareness related to the selected geographic area.

For example, if camera system 10, via processor 22 and image analysis module 20, detects a plurality of turkeys in the video data file, the object detection machine learning algorithms and/or computer vision algorithms may predict that two of the turkeys are male with the rest being female. Microphone 46 (which may be a directional microphone also pointed in the same direction as camera 12 via actuating unit 30) may record animal sounds. An audio analysis module 48 may include computer executable instructions stored in memory 16 such that processor 22 may instruct an independent audio machine learning algorithm to analyze the sound data file and detect and classify animal sounds, such as for example, turkey gobbles for males and clucking sounds for females. Thus, if camera system 10 predicts that there are two males present at a given time via image analysis module 20 determining that there are one or more animal outlines and audio analysis module 48 determines that microphone 46 has recorded the sounds of two males gobbling at or around the same time frame, the confidence of the determination of two male turkeys may be higher than when based upon the digital images alone. In another example, microphone 46 and audio analysis module 48 may identify and classify three males gobbling, but camera 12 and image analysis module 20 may only witness two males. A user may then assume there were three male turkeys in the area, but that only two were captured in the video data file. Moreover, the combination of camera 12 and microphone 46 may also enable improved identification of species, particularly between similar shaped animals, such as for example, turkeys, geese and ducks or cows, horses and deer.

In accordance with a further aspect of the present invention, camera system 10 may be configured to be deployed and operated outdoors, and may be located a prohibitive distance from a municipal electrical power supply. To that end, camera system 10 may include a battery unit 50, which may include a rechargeable battery such as but not limited to, one or more lithium ion batteries. Camera system 10 may also include one or more charging devices, such as solar panels 52, to enable autonomous charging of battery unit 50. As a result, battery unit 50 may continuously provide the necessary electrical energy to power each component of camera system 10, such as camera 12, computer module 18, actuating unit 30, sensor suite 36 and microphone 46.

Computer system 10 may further include a display 53, such as a monitor or touch screen display. Shown in FIGS. 5-15 are representative images presented on display 53 via instructions or data received from a user interface module 54. User interface module 54 may be and interface between display 53 and onboard camera 12, computing device 18 and/or remote computing device 24. User interface module 54 may also be configured to receive inputs from an input device 55, such as a keyboard, mouse, stylus and/or touch screen input controller, of computing device 18 and/or remote computing devices 24a, 24b, 24c for processing computer executable instructions using processor 22 and using other components of computing device 18.

Figure 5:
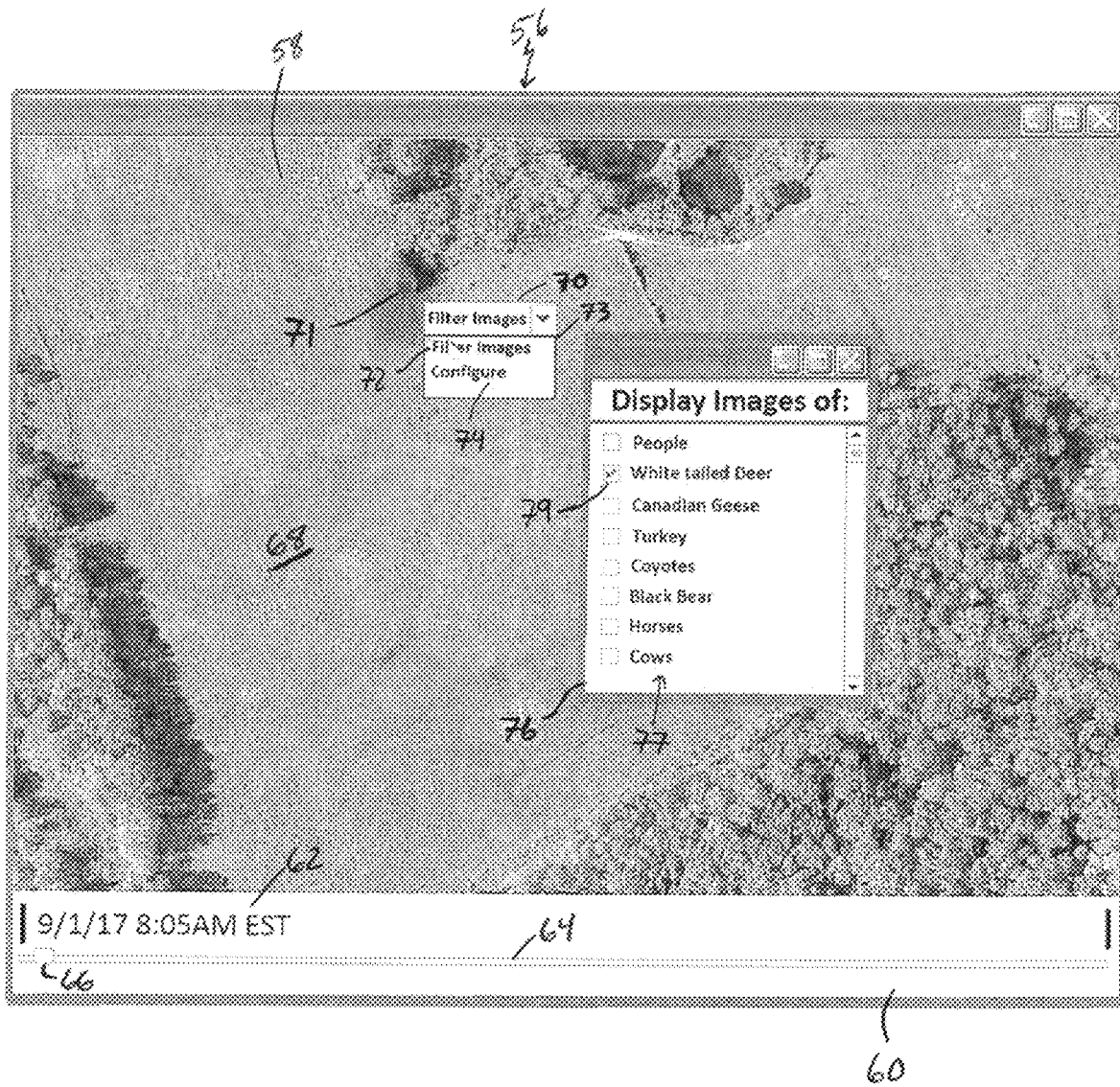
FIG. 5 is an exemplary screen shot of a user interface provided in accordance with the present invention.

With reference to FIG. 5, user interface module 54 may, utilizing processor 22, output to display 53 a display window 56 having a main screen portion 58 along with an information bar 60 which may include display metadata 62 relating to the date and time of the digital image being shown within main screen portion 58. A timeline 64 is also provided along with a slide 66 that is configured to enable a user to selectively position slide 66 along timeline 64 so as to display a user selected digital image associated with the slide 66 position. It should be understood that the plurality of digital images that are available for display using slide 66 are included within a video data file stored in memory 16 of computing device 18. In accordance with an aspect of the present invention, main screen portion 58 may generally display an overhead (aerial) satellite map view of a selected geographic area 68 with camera system 10 identified within the overhead satellite map view by a camera system icon 71. The overhead satellite map view may be a satellite digital image that is associated with the geographic location of camera system 10, which is retrieved from memory 16 of camera system 10, or a satellite map application program (e.g., GOOGLE maps) located on a remote server 69 that is accessible over network 28 (e.g., Internet), based upon the GPS metadata received from GPS sensor 38.

Figure 6:
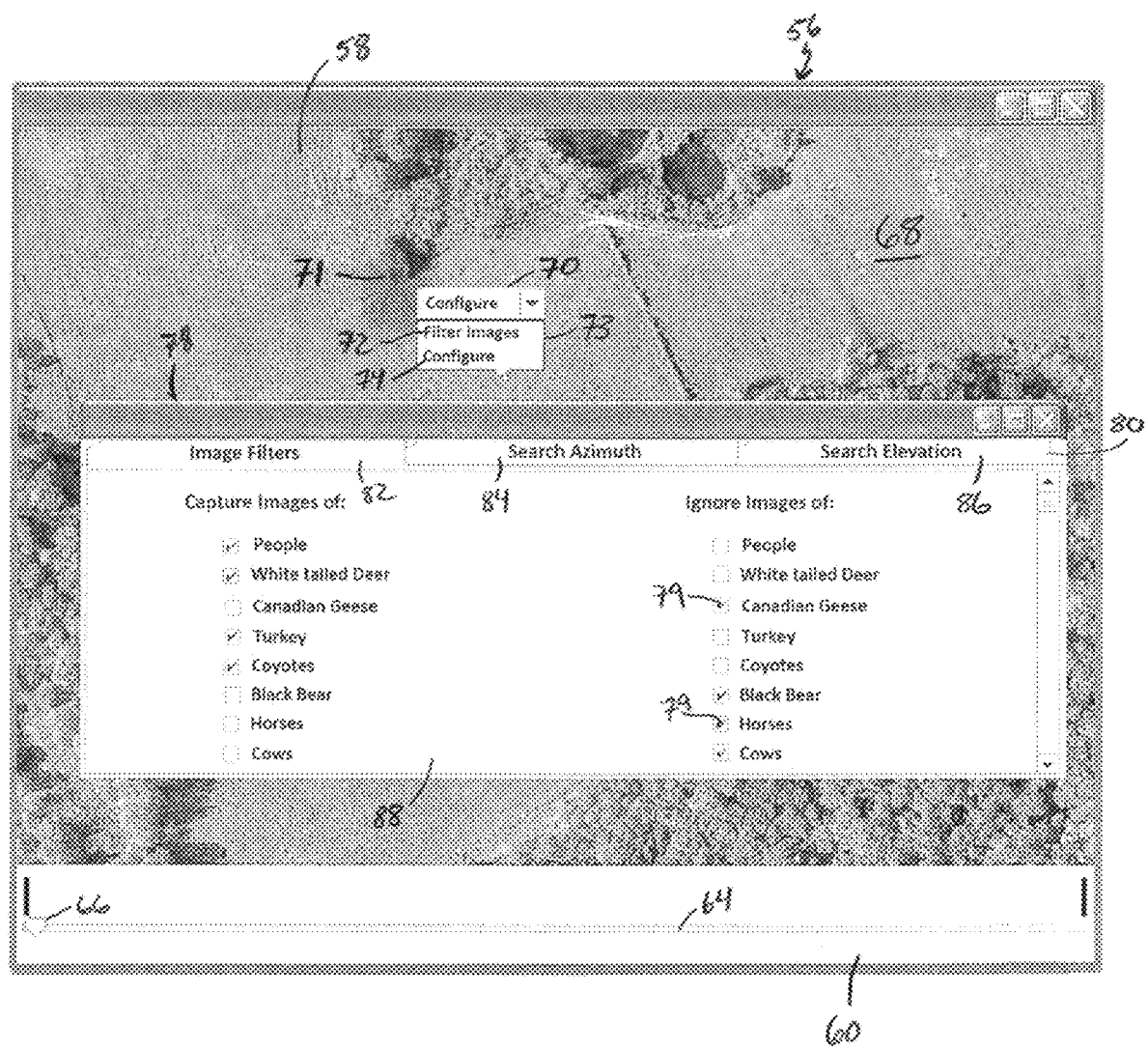
FIG. 6 is an exemplary screen shot of the user interface in FIG. 4 showing a dialog box for configuring the camera of the trail camera system.

A user may initiate a camera control window 70 within main screen portion 58 through activation of camera system icon 71 using input device 55, such as through touching camera system icon 71 using the touching screen or stylus, or by clicking icon 71 using a mouse. By way of example, as shown in FIG. 5, a "Filter Images" camera control window 70 may display a dropdown table 73 providing the user with an option to "Filter Images" 72 or "Configure" the camera 74. Activation of "Filter Images" 72 tab opens a dialog box 76 which may include a scrollable list of animal species 77. A user may then use input device 55 to selectively toggle/untoggle select animal species whereby the computer vision algorithms and object detection machine learning algorithms (and the audio machine learning algorithm) may selectively analyze the image/sound files and detect only those animal species toggled within dialog box 76 (such as those indicated by one or more check marks 79). Alternatively, as shown in FIG. 6, a user may use input device 55 to select the "Configure" tab 74 which opens an alternative dialog box 78. Dialog box 78 may include a toolbar 80 with multiple sub-tabs 82, 84, 86. By way of example, sub-tab 82 may open an "Image Filter" screen 88 similar to dialog box 76 described above, sub-tab 84 may open a "Search Azimuth" screen 90 (FIG. 7) and sub-tab 86 may open a "Search Elevation" screen 92 (FIG. 8).

Figure 7:
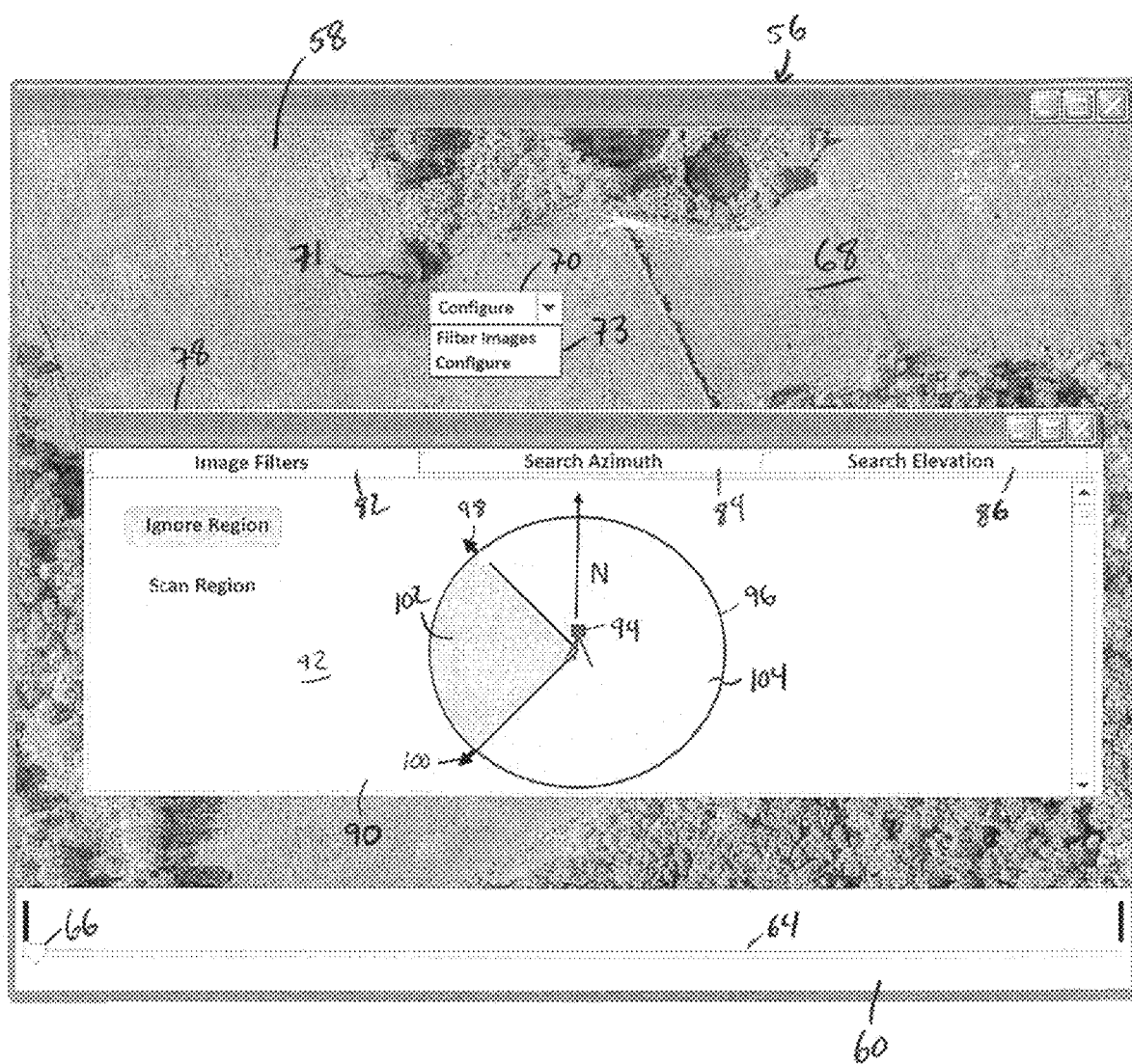
FIG. 7 is an exemplary screen shot of the user interface in FIG. 4 showing a dialog box for configuring the camera azimuth angle.

As shown in FIG. 7, the "Search Azimuth" screen 90 may display an action window 92 with an icon 94 representative of camera 12 within main screen portion 58. A circle 96 representative of the field of view camera 12 circumscribes camera icon 94. A pair of radially extending arrows 98, 100 may extend outwardly from camera icon 94 and segregate circle 96 into an "Ignore Region" 102 and "Scan Region" 104. A user may adjust the location of either or both arrows 98, 100 using input device 55 to selectively establish the "Ignore" and "Scan" regions 102, 104. In operation, as described above, processor 22 may control powering of pan motor 32 such that camera 12 may horizontally sweep only that portion of selected area 68 corresponding to the "Scan Region" designated between arrows 98, 100. Thus, camera 12 may be configured to operate as a single view camera having a fixed (0 degree sweep) field of view (arrows 102 and 104 coincide), may be configured to horizontally sweep up to 360 degrees, or may be configured to horizontally sweep any user-selected range therebetween.

Figure 8:
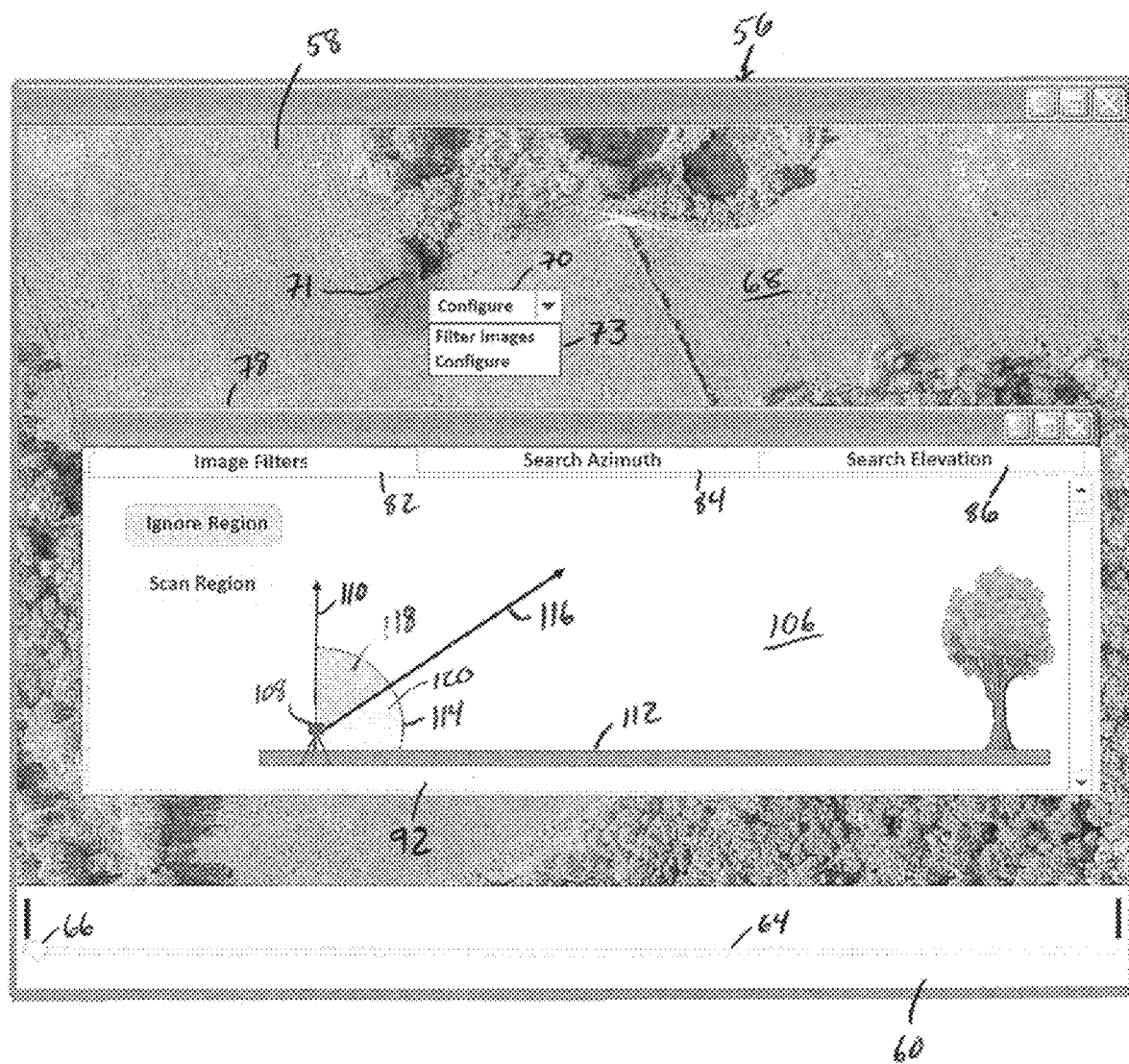
FIG. 8 is an exemplary screen shot of the user interface in FIG. 4 showing a dialog box for configuring the camera elevation angle.

As shown in FIG. 8, the "Search Elevation" screen 92 may display an action window 106 with an icon 108 representative of camera 12 within main screen portion 58. A vector 110 extends perpendicular from horizontal plane 112 to thereby define a 90 degree arc 114. A radially extending arrow 116 extends outwardly from camera icon 94 and segregates arc 114 into an "Ignore Region" 118 defined to be between vector 110 and arrow 116 and "Scan Region"  120 defined to be between arrow 116 and horizontal plane 112. A user may adjust the location of arrow 116 using input device 55 to selectively establish the "Ignore" and "Scan" regions 118, 120. In operation, as described above, processor 22 may control powering of tilt motor 30 such that camera 12 may vertically sweep only that portion of the selected region corresponding to the "Scan Region". Thus, camera 12 may be configured to scan along the horizon so as to detect animals such as deer, but may also be configured to scan a user selected elevation so as to detect birds, such as geese, ducks or wild turkeys while they are in flight.

Figure 9:
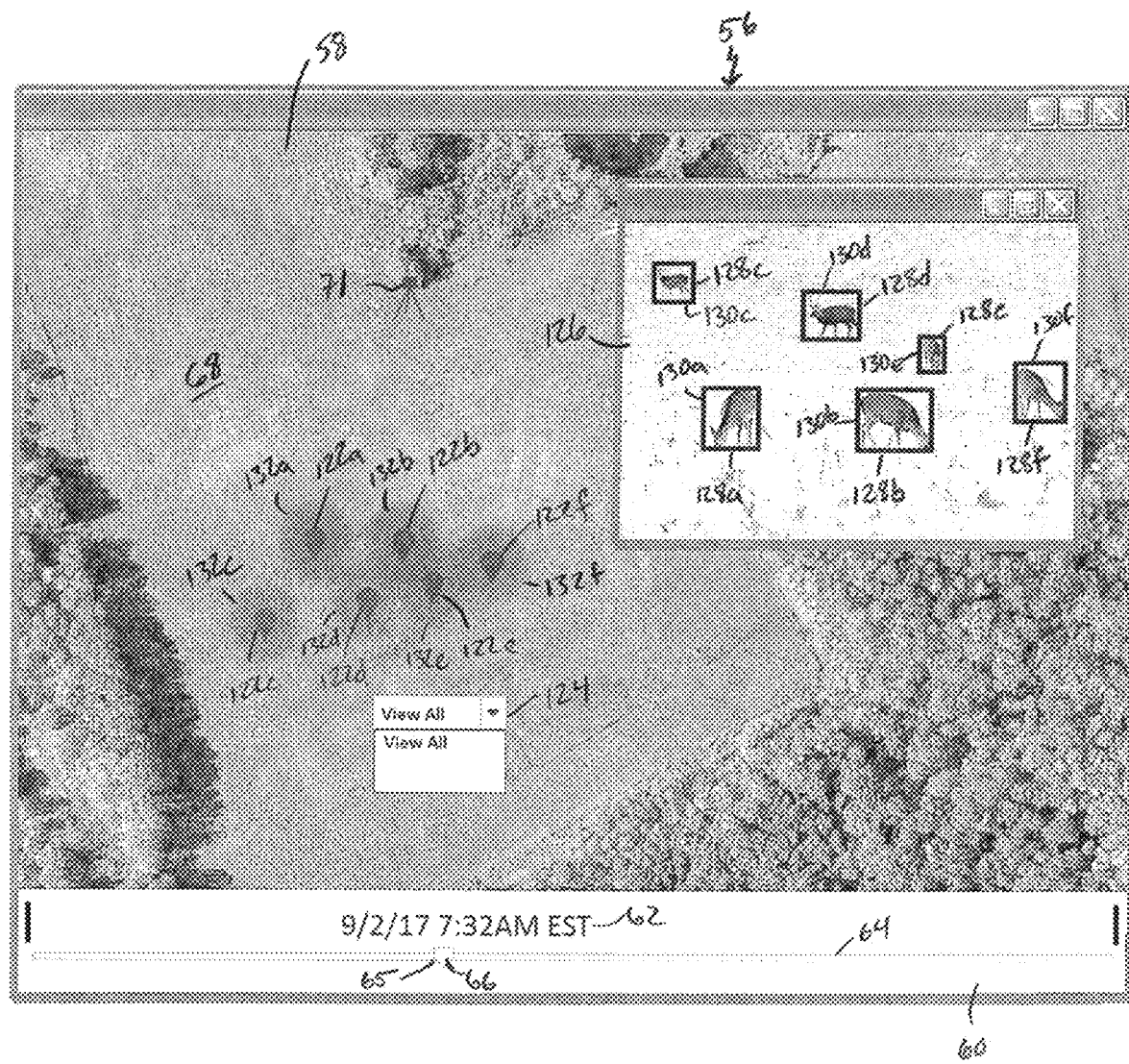
FIG. 9 is an exemplary screen shot of the user interface in FIG. 4 showing a dialog box having an image captured by the camera with all animals highlighted.
Figure 10:
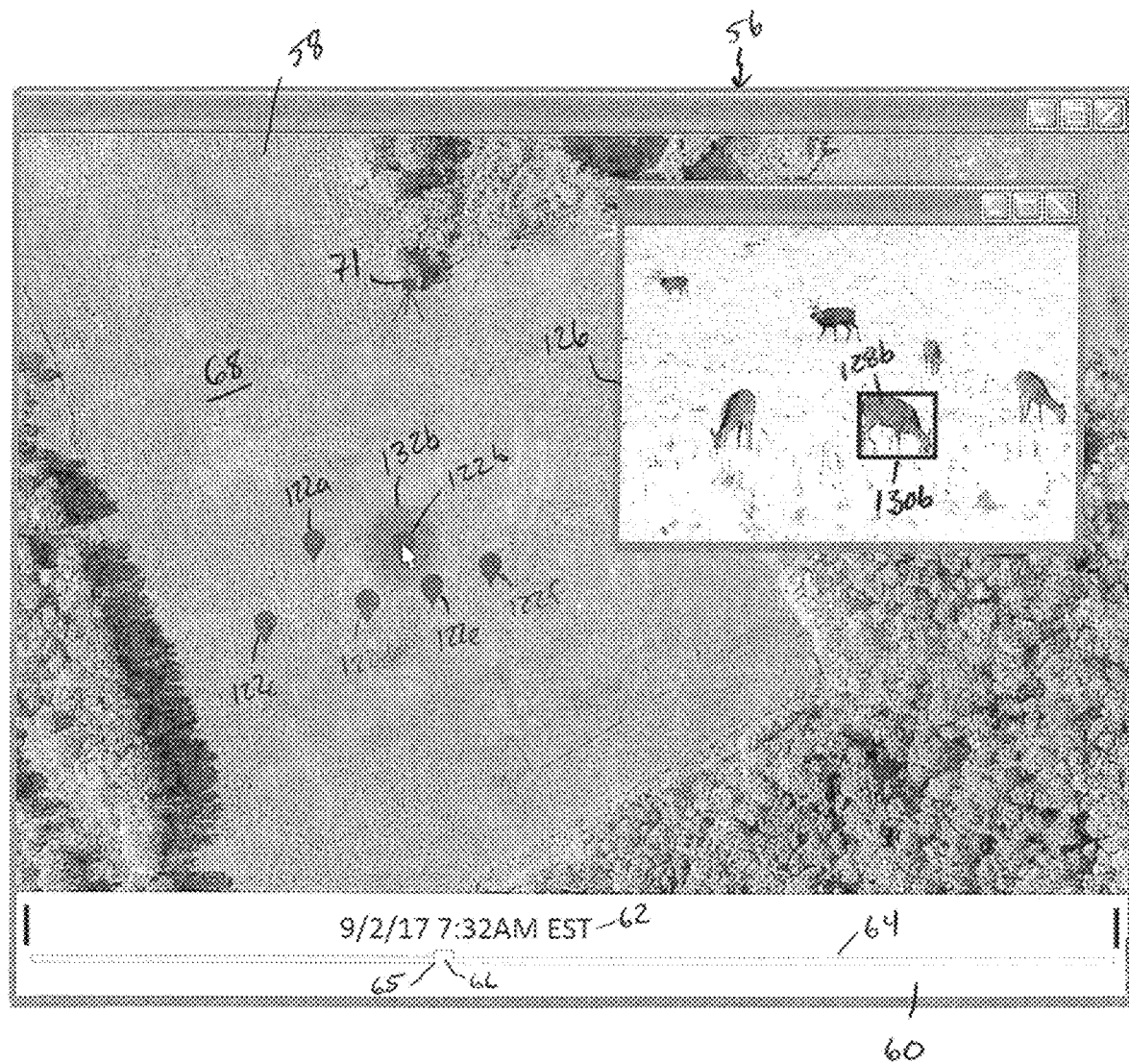
FIG. 10 is an exemplary screen shot of the user interface in FIG. 4 showing a dialog box having an image captured by the camera with a selected animal highlighted.

Turning now to FIGS. 9 and 10, timeline 64 has been advanced to a first selected discrete portion 65 of the video data file obtained from a camera system 10 identified with camera system icon 71, as indicated by the position of slide 66. First selected discrete portion 65 populates main screen portion 58 with detected animals indicated thereon by a plurality of tags or pins 122a-122f. As shown in FIG. 9, a user may use input device 55 to open a dialog box 124 whereby the user may select the "View All" option. Selecting "View All" opens another window 126 showing the image captured by camera 12 with those animals 128a-128f detected by image analysis module 20 outlined, such as via a respective bounded region 130a-130f. Each pin 122a-122f may also include an indicia 132a-132f (e.g., highlighted portion) indicating that the respective animal 128a-128f in window 126 is outlined by a bounded region 130a-130f. Alternatively, as shown in FIG. 10, a user may use input device 55 to select one pin (e.g., pin 122b) of the plurality of pins 122a-122f as indicated by highlighted portion 132b. Window 126 may then display the digital image with only animal 128b being outlined by a bounded region 130b. It should be understood by those skilled in the art that while shown and described as being outlined by a bounded region, other outlines may be used, such as an image segmentation described above with regard to FIG. 3B. In a further aspect of the present invention, image analysis module 20 may be configured to detect all deer but highlight only bucks and not does or fawns. That is, only pins identifying bucks would include a highlighted portion, such as highlighted portion 130b. In this manner, a user may detect, identify and track individual animals or animal sexes, such as to identify potential targets for hunting or to promote population management and control.

Figure 11:
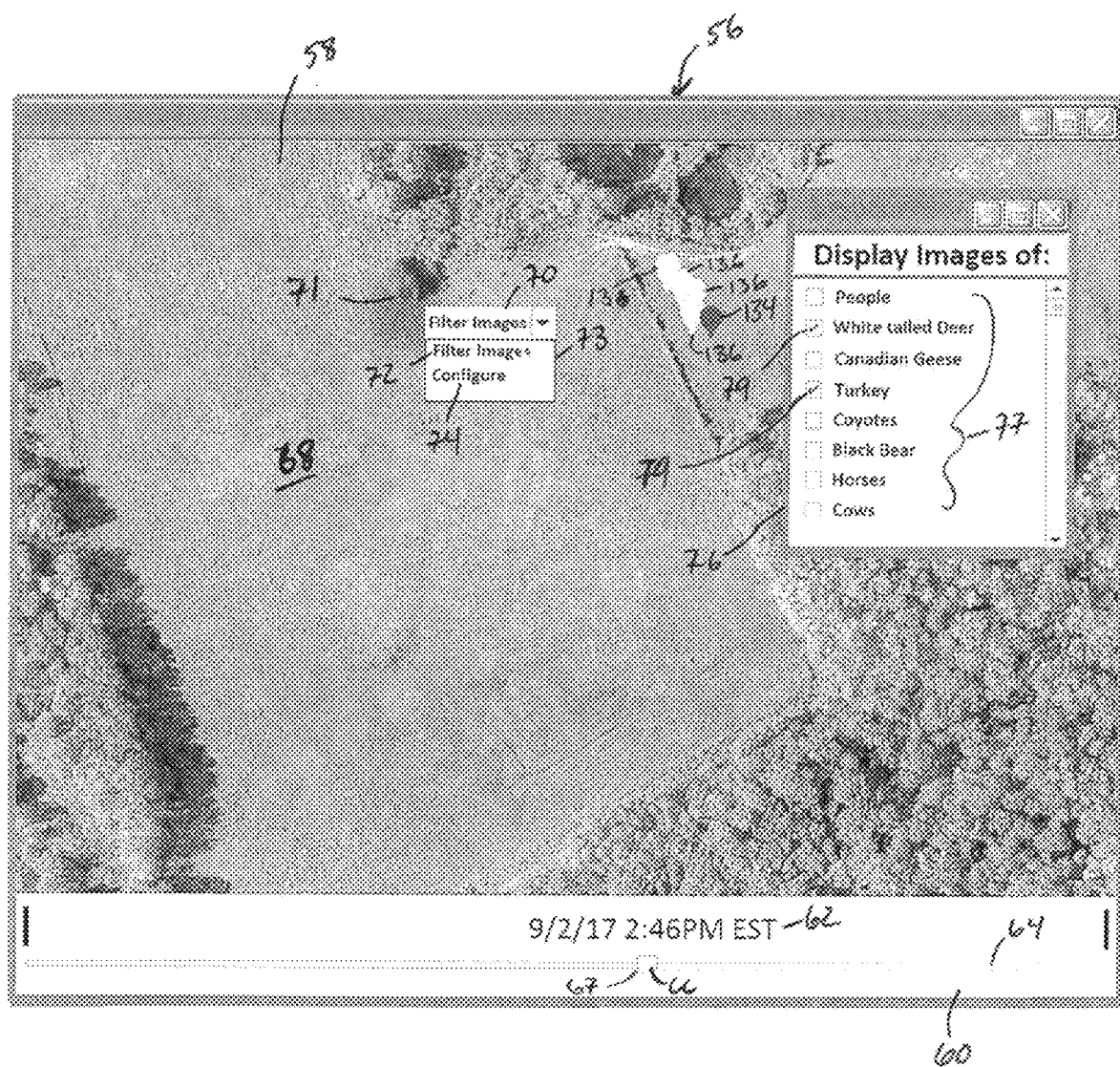
FIG. 11 is an exemplary screen shot of the user interface in FIG. 4 showing a dialog box for configuring the camera of the trail camera system to select more than one target animal.
Figure 12:
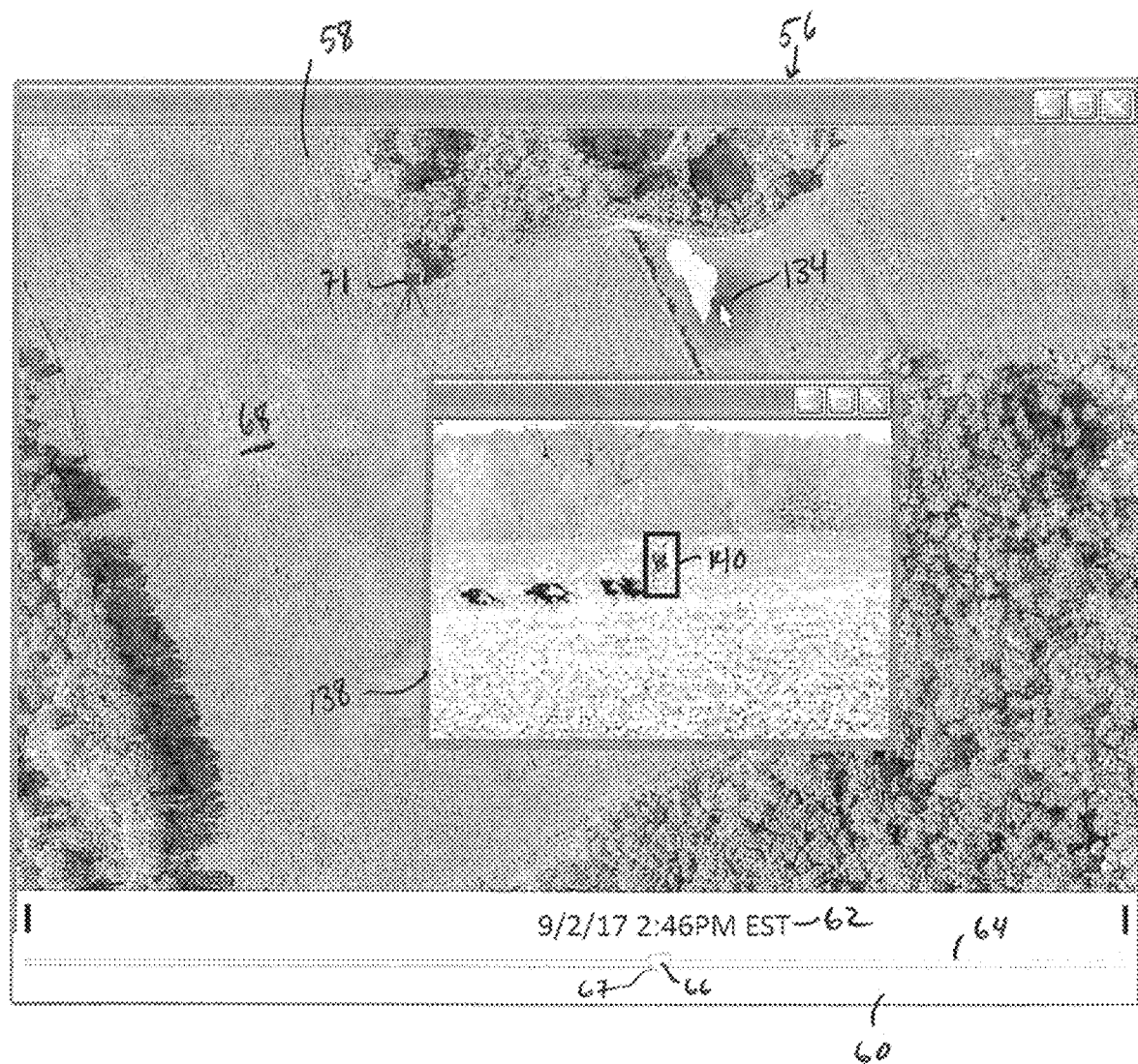
FIG. 12 is an exemplary screen shot of the user interface in FIG. 10 showing a dialog box having an image captured by the camera with a selected animal highlighted.
Figure 13:
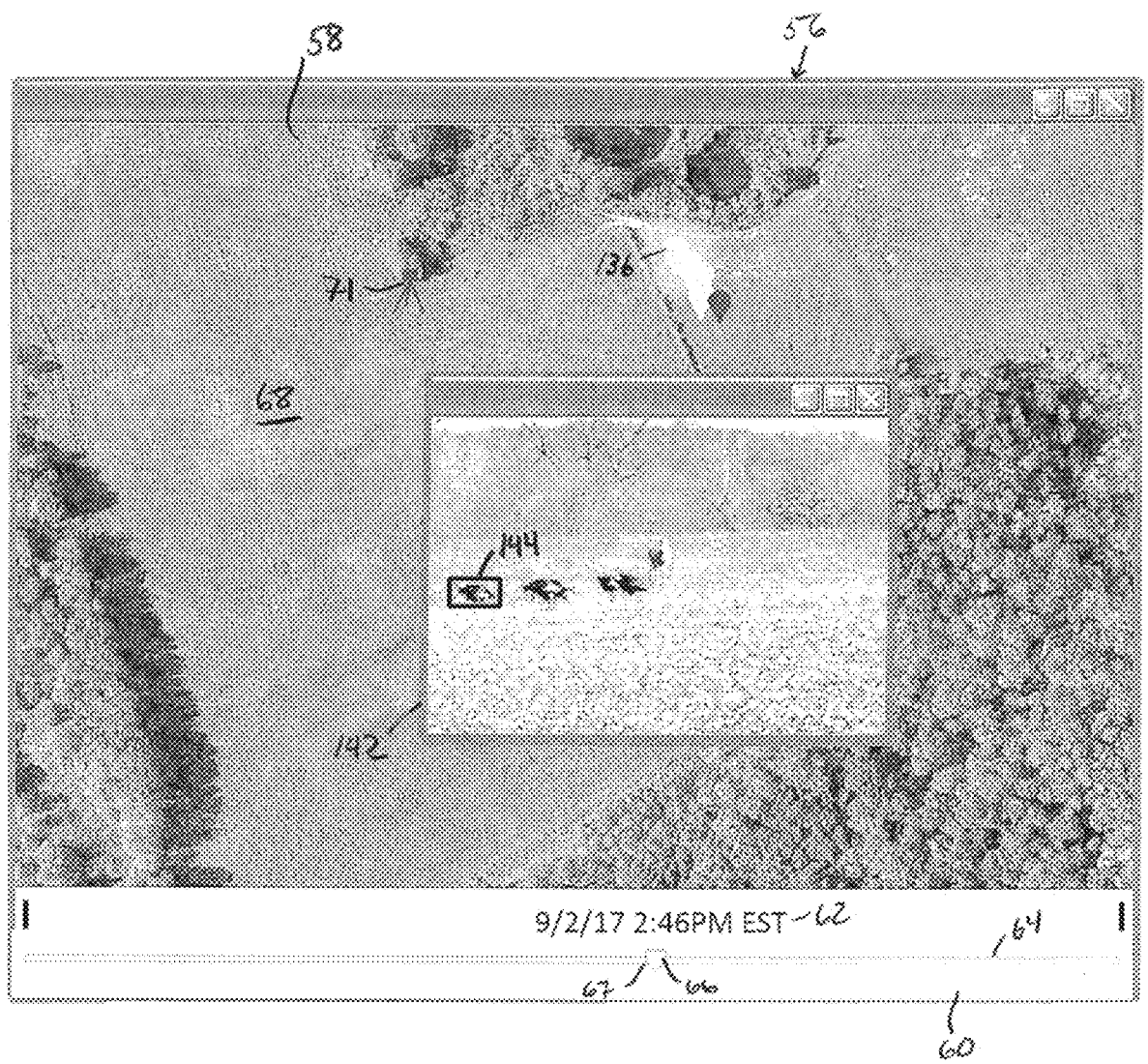
FIG. 13 is an exemplary screen shot of the user interface in FIG. 10 showing a dialog box having an image captured by the camera with a second selected animal highlighted.

FIGS. 11-13 show various exemplary screenshots of main screen portion 58 after timeline 64 has been further advanced to a second selected discrete portion 67 of the video data file obtained from a camera system 10 identified with camera system icon 71. As shown in FIG. 11, camera system icon 71 has been selected by the user through input device 55 so as to open the "Filter Images" 72 tab and dialog box 76 with scrollable list 77 as described above. As indicated by check marks 79, the user has selected "White tailed Deer" and "Turkey" as the target animals. As described above, main screen portion 58 may indicate detections of the target animals through placement of pins 134, 136. Image analysis module 20, via processor 22, may designate different species with distinguishable pins when more than one selected species is detected within the discrete portion of the video data file. With reference to FIGS. 11 and 12, a white tailed deer may be designated using a dark colored pin 134 such that selecting dark colored pin 134 using input device 55 opens a window 138 (FIG. 12) showing the camera image with the selected deer outlined, such as via a bounded region 140. As shown in FIGS. 11 and 13, each turkey may then be designated by a light colored pin 136 such that selecting an individual light colored pin 136 using input device 55 opens a window 142 (FIG. 13) showing the camera image with the selected turkey outlined, such as via a bounded region 144. In this manner, a user may be able to interrogate an image for total wildlife population within the discrete portion of the video data file while also selectively extracting information to specified species of animals and individual animals.

Figure 14:
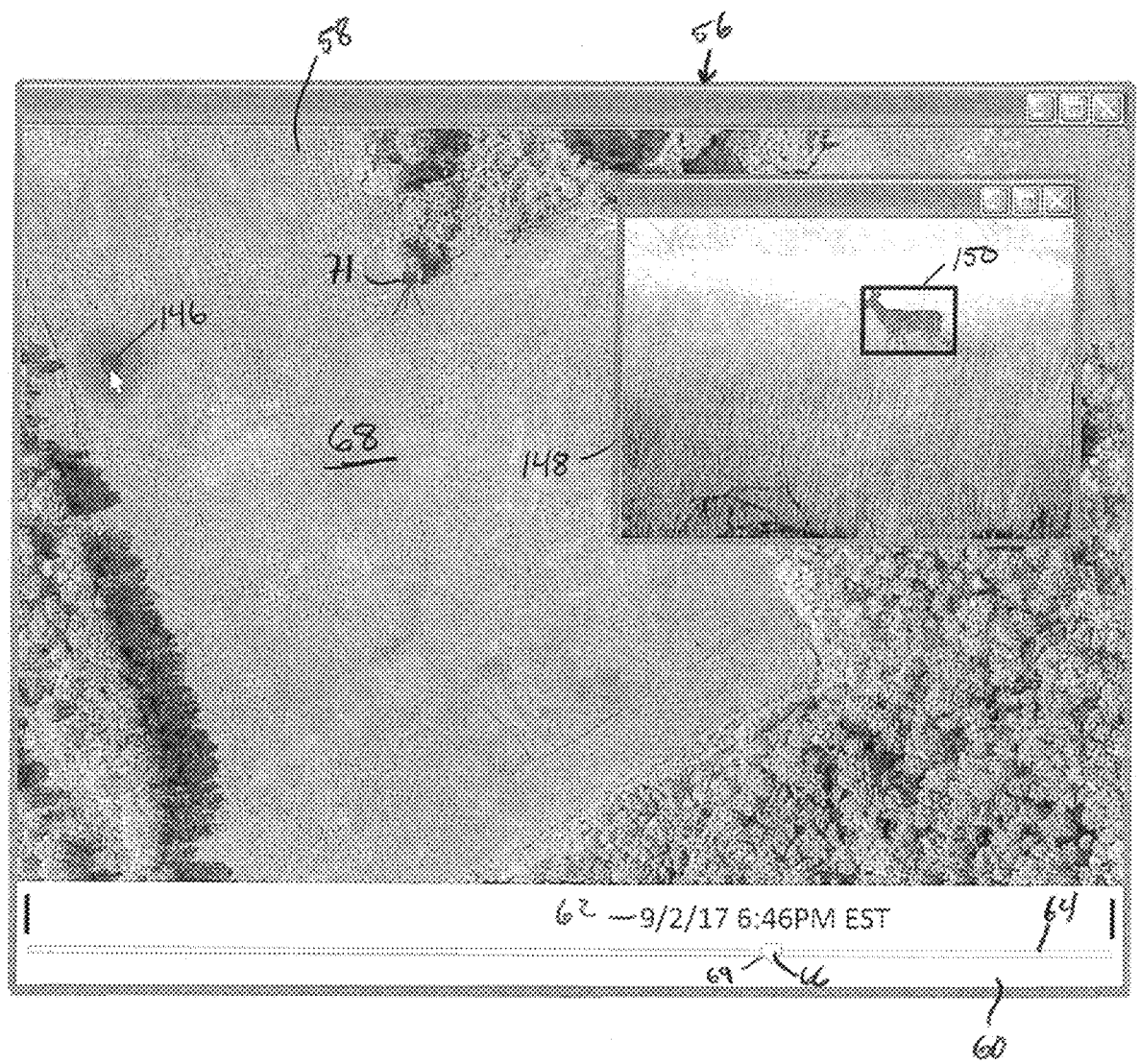
FIG. 14 is an exemplary screen shot of the user interface in FIG. 4 showing a dialog box having an image captured by the camera.

FIG. 14 is another example of a screenshot of main screen portion 58 after timeline 64 has been further advanced to a third selected discrete portion 69 of the video data file obtained from a camera system 10 identified with camera system icon 71. As shown in FIG. 14, a pin 146 has been selected using input device 55 with a window 148 opened showing the camera image with the selected pin (in this case a deer) outlined, such as via a bounded region 150. It should be noted that timeline 64 and each of the selected discrete portions 65, 67, 69 of the video data file were captured by camera system 10 at a single location as indicated by camera system icon 71 in FIGS. 9-14. In these examples, actuating unit 30 panned camera 12 so as to capture video images across selected area 68. By way of example, when viewing FIGS. 9-14, FIGS. 9 and 10 captured images below camera system icon 71; FIGS. 11-13 captured images to the right of camera system icon 71; and FIG. 14 captured images to the left of camera system icon 71. As such, a single camera system 10 in accordance with the present invention was able to scan and collect image data over an arc of about 180 degrees centered at camera 12. As would be recognized by those skilled in the art, camera system 10 may eliminate the need for monitoring systems which employ multiple cameras wherein individual cameras cover only a small portion of the total monitored area. Using a single camera may greatly reduce equipment costs while also improving monitoring efficiencies over traditional multi-camera systems.

Figure 15:
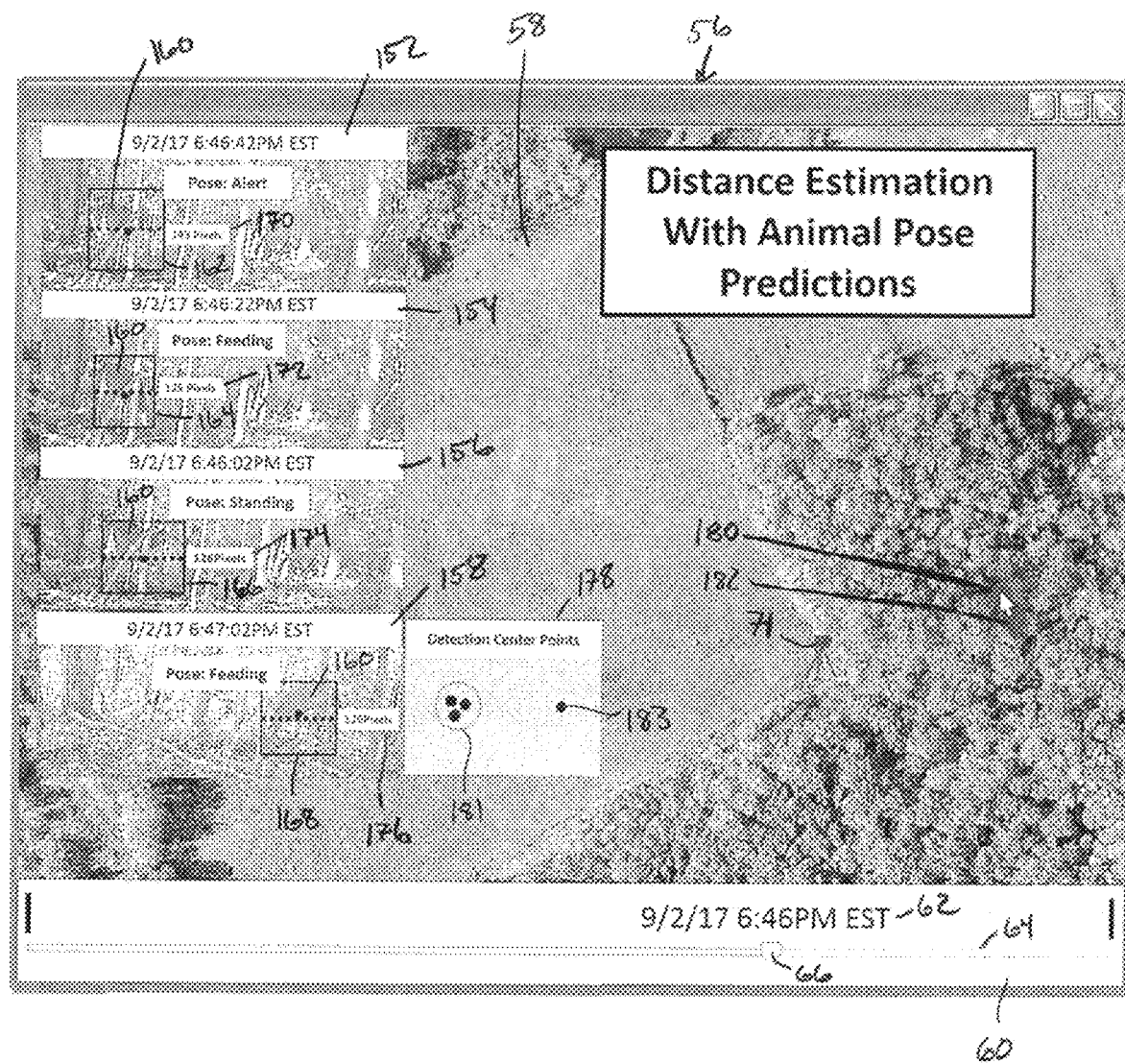
FIG. 15 an exemplary screen shot of the user interface in FIG. 4 showing multiple dialog boxes each having an image captured by the camera with a target animal highlighted and multiple pins tracking the animal over time.

Turning now to FIG. 15, image analysis module 20, via processor 22, may compile and display main screen portion 58 with image windows 152, 154, 156, 158 comprising images captured over a period of time. By way of example, FIG. 15 includes four images taken every twenty (20) seconds, thereby sampling one minute of video data; e.g., window 152 displays an image taken at t=0; window 154 displays an image taken at t=20 seconds; window 156 displays an image taken at t=40 seconds and window 158 displays an image taken at t=60 seconds. As seen in each image, image analysis module 20 has detected, identified, and outlined a deer 160, such as via a respective bound box region 162, 164, 166, 168. Image analysis module 20 may also calculate and display the number of pixels 170, 172, 174, 176 (such as along a horizontal axis) of each bounded region 162, 164, 166, 168. Image analysis module 20 may also calculate an average pixel value over time by averaging the value of pixels 170, 172, 174, 176. Moreover, image analysis module 20 may also predict, through the computer vision algorithms and the object detection machine learning algorithms, an animal pose and adjust the pixel value of pixels 170, 172, 174, 176 to compensate for different animal positions, such as "Alert"—image window 152; "Feeding"—image window 154; "Standing"—image window 156; and "Feeding"—image window 158.

Image analysis module 20, along with GPS sensor 38 and accelerometer 40 may also determine a location of deer 160 within each window 152, 154, 156, 158 and plot that location within a subset window 178. Image analysis module 20, utilizing processor 22 and the computer vision algorithms and the object detection machine learning algorithms stored in memory 16, may be configured with a distance threshold value, such as, and without limitation, 10 feet, such that should an animal, such as deer 160, be successively imaged at a location within the threshold value over a time interval (such as 20 seconds), main screen portion 58 may be populated with a single pin 180 indicative of that clustered location 181. However, should deer 160 move beyond the threshold value (e.g., more than 10 feet over 20 seconds), main screen portion 58 may be populated with a second pin 182 indicative of this new location 183. In this manner, as each image is time-stamped by image analysis module 20, movement of an animal may be tracked across all or a portion of the timespan of a video data file. Thus, a user may be able to determine where an animal enters the field of view of the camera, exits the field of view of the camera, the path the animal travels between the entrance and exit, and the amount of time the animal spends within the field of view and at particular locations therein. As a result, a user may be able to track and predict an animal's movements over time.

Figure 16:
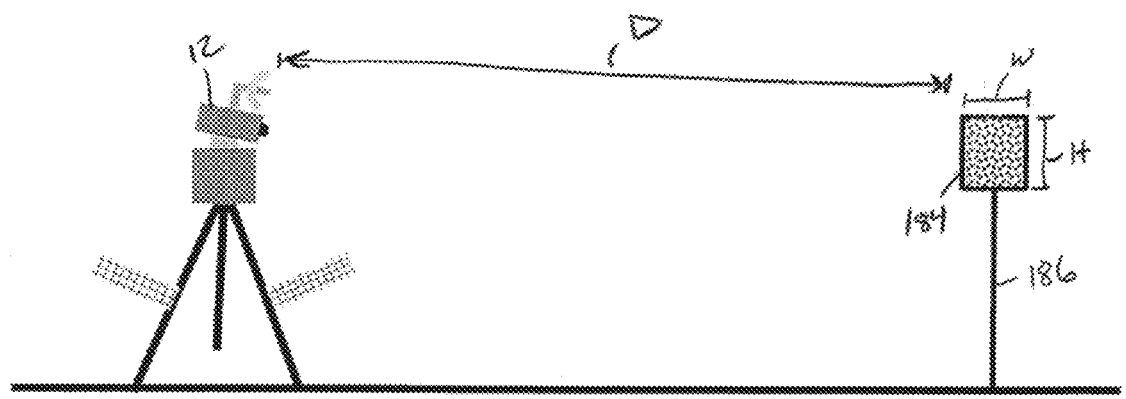
FIG. 16 is a schematic view of a method to calibrate the focal length of a camera used within a trail camera system in accordance with an aspect of the present invention.

In accordance with an aspect of the present invention, to enable proper distance determinations, the focal length of camera 12 may need to be calibrated prior to use, and possibly periodically thereafter. One example of a calibration method, and without limitation thereto, is to use a calibration blank. In this example and as shown in FIG. 16, the size of the calibration blank 184 is known, for instance a 12 inch×12 inch square. A user may place calibration blank 184 in selected area 68, such as on a stick or tree 186, and then measure the distance D between calibration blank 184 and camera 12. This distance may be measured by any suitable means, such as but limited to, a tape measure, a laser range finder, or the user pacing it off to approximate the distance. In this manner, knowing the size of calibration blank 184 and its distance D from camera 12, image analysis module 20 may then measure the width W and height H of calibration blank 184 in pixels and calculate the focal length of camera 12 therefrom.

If camera 12 is a zoom camera, the focal length will be different at each zoom level such that calibration at various zoom levels may be similarly calculated. Memory 16 may then include a lookup table populated with focal length values corresponding to the various zoom levels. Once camera system 10 has been deployed in the field, the zoom level of camera 12 may be entered into memory 16 automatically by camera 12 or through user interface module 54 via input device 55. Image analysis module 20, via processor 22, may then convert the zoom level to the calibrated focal length and use the calibrated focal length in subsequent calculations of animal locations as described above.

Figure 17:
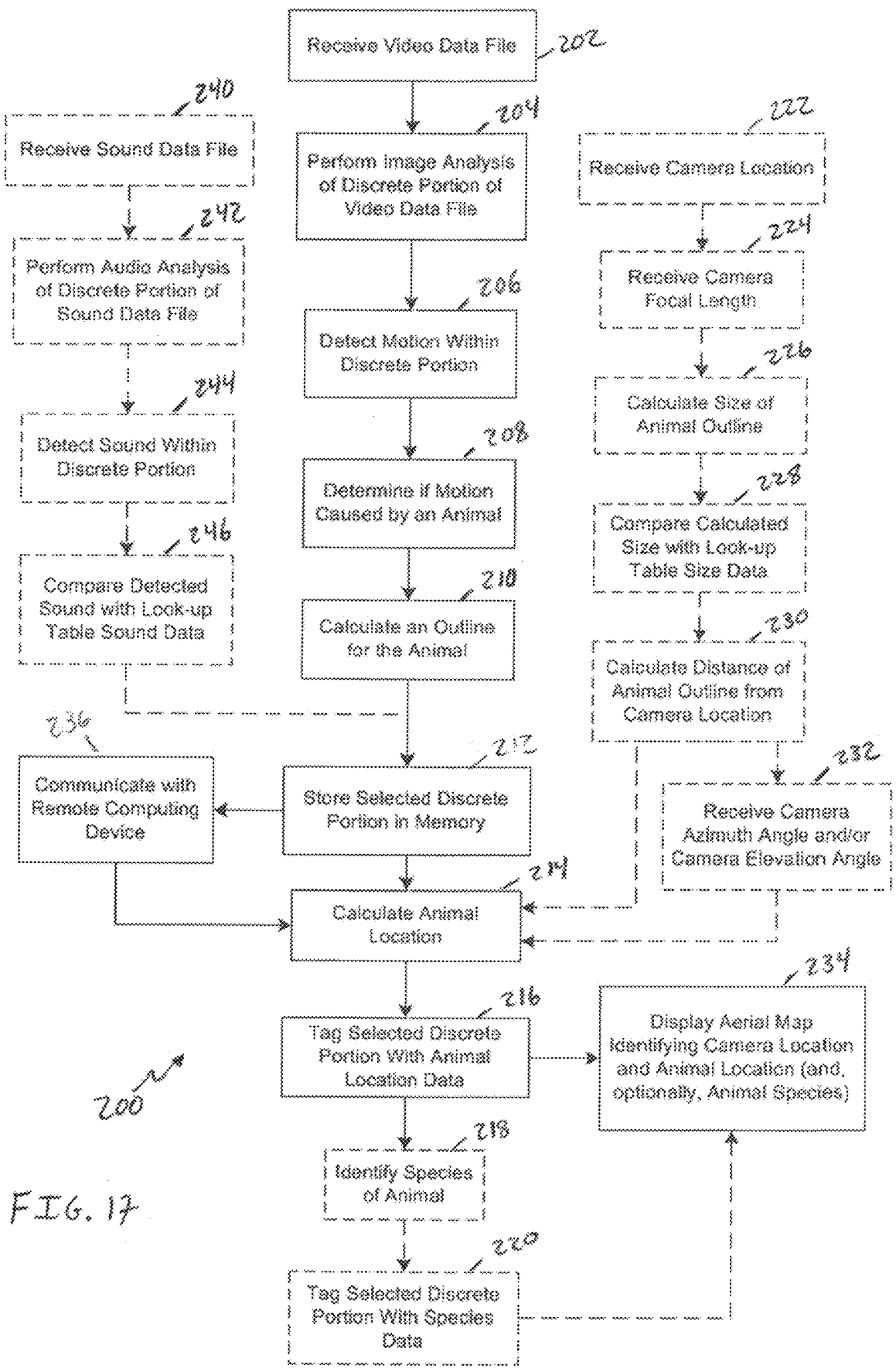
FIG. 17 is a flow chart showing an exemplary algorithm that may be implemented in accordance with the present invention.

Turning now to FIG. 17, shown is an exemplary method 200 for autonomously photographing wildlife using a camera system in accordance with an aspect of the present invention. As described above, camera system 10 may be configured to record video data and therefore include the utilization of one or more of camera 12, memory 16 and processor 22 and associated image analysis module 20 for facilitating image analysis of the video data. The method may comprise the steps of: providing or receiving a video data file (step 202); performing an image analysis of one or more discrete portions of the video data file (step 204); detecting one or more animals within each respective discrete portion of the video data file (step 206); calculating, generating, or otherwise determining an outline for each of the detected animals (step 210); and storing a selected discrete portion of the video data file in a memory (such as memory 16), wherein the selected discrete portion includes at least one respective outline of the detected animals (step 212).

As further shown in FIG. 17, camera system 10 may be further configured to calculate an animal location for each of the respective animal outlines (step 214); and tag the selected discrete portion of the video data file with global positioning satellite metadata for each calculated animal location (step 216). Optionally, camera system 10 may be further configured for identifying a species and/or sex for each of the detected animals (step 218); and tag the selected discrete portion of the video data file with the identified species and/or sex for each of the detected animals (step 220).

As described above, memory 16 may further include a look-up table comprising average animal size data for a plurality of animal species. Accordingly, method 200 may further optionally include the steps of: calculating a location of each of the detected animals by receiving global positioning data representative of a location of camera system 10 (step 222); receiving a camera focal length (step 224); calculating a size of a respective animal outline (step 226); comparing the calculated size of the respective animal outline with the look-up table size data for the identified species (step 228); and calculating a distance of the respective animal outline from the camera location, wherein the distance is converted to the global positioning satellite metadata (step 230) so that the location of the detected animals can be plotted and displayed on a digital aerial map. The step of calculating a location of each of the detected animals may further optionally include receiving a camera azimuth angle and/or a camera elevation angle from an actuating unit prior to calculating a distance of the respective animal outline from the camera location (step 232).

As further shown in FIG. 17, method 200 may include the additional step of displaying, using the image analysis module utilizing the processor, an aerial map identifying a location of camera system 10 and the global positioning satellite metadata for each calculated animal location and optionally, associating the identified species and/or sex for each of the one or more animals with its respective global positioning satellite metadata (step 234).

In a further aspect of the invention, method 200 may further include computing device 18 communicating, such as through wireless communication 26, with a remote computing device 24a, 24b, 24c through a network 28 (step 236). Remote computing device 24a, 24b, 24c may then calculate an animal location for each of the animal outlines (step 214), tag the selected discrete portion of the video data file with global positioning satellite metadata for each calculated animal location (step 216), and optionally identify a species and/or sex for each of the one or more animals (step 218) and tag the selected discrete portion of the video data file with the identified species and/or sex for each of the one or more animals (step 220), as described above. Remote computing device 24a, 24b, 24c may further receive a camera location (step 222) and display an aerial map identifying the camera location and the global positioning satellite metadata for each calculated animal location and associates the identified species and/or sex for each of the one or more animals with its respective global positioning satellite metadata (step 234).

In still another aspect of the present invention, and as described above, camera system 10 may further include microphone 46 configured to record audio data utilizing processor and audio analysis module. In this manner, method 200 may further include the steps of: providing or receiving a sound data file (step 240); performing an audio analysis of one or more discrete portions of the sound data file (step 242); detecting at least one sound within each respective discrete portion of the video data file (step 244); comparing the detected sound with a look-up table animal sound data to determine whether the detected sound is a detected animal sound (step 246); storing a selected wherein the selected discrete portion includes at least one detected animal sound (step 212). Steps 218 and 220 of method 200 may further include identifying a species and/or sex of the animal as determined by the detected animal sound and tagging the selected discrete portion of the sound data file with the identified species and/or sex, respectively.

As can be seen through the above discussion and in the following claims, the present invention addresses deficiencies in the art by autonomously recording wildlife while employing image analysis algorithms that interrogate the recorded images to filter out only those images which contain an animal (or a user-selected species or sex of animal) for storage in memory and/or communication to a remote computing device for further analysis. The present invention may further analyze the images to detect and classify selected animals and optionally display the geospatial location of each detected animal a digital map. In a further aspect of the present invention, the camera may also be configured to tilt and/or pan whereby a large expanse may be monitored by a single camera. Time, location and other image metadata may then be used to assist in animal control and to identify potential targets, times and locations for hunting. Still further, image analysis may be conducted at (and through) the camera, remotely at a remote computing device which is in communication with the camera over a network, or a combination of the two. In this manner, computer memory (at the camera and/or at the remote computing device) and network traffic may be optimized as only those images of select animals are stored and/or transmitted. Moreover, a user may review images more efficiently as non-animal containing images have been pre-screened and discarded by the image analysis software.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Further, although processes, methods, and the like have been described above and/or within in the claims as having acts in a certain order, it should be understood by those skilled in the art that such processes and methods may be configured to work in any alternate order that is practical and that such additional and alternative processes or methods are to be considered within the teachings of the instant disclosure. Therefore, the foregoing description is to be considered exemplary, rather than limiting, and the true scope of the invention is that described in the following claims.

What is claimed is:

1. A camera system for autonomously photographing wildlife comprising:
   a camera configured to capture video data in a selected geographic area, wherein the camera includes a field of view;
   a camera mount configured to support the camera relative to a support surface;

an actuating unit coupling the camera to the camera mount, wherein the actuating unit is actuatable to tilt and/or pan the camera relative to the support surface;

a memory configured for receiving the video data from the camera and storing the video data in a video data file;

a processor for facilitating image analysis of the captured video data in the video data file, wherein the processor operates the actuating unit to pan and/or tilt the camera to horizontally and/or vertically sweep the selected geographic area; and an image analysis module stored in the memory, wherein the image analysis module includes computer executable instructions stored in the memory, wherein the image analysis module utilizes the processor to perform the steps of:

receiving the video data file;

performing an image analysis of one or more discrete portions of the captured video data in the video data file;

detecting and classifying one or more moving and stationary animals within at least one of the one or more discrete portions of the captured video data in the video data file using an object detection machine learning algorithm while the actuating unit is panning and/or tilting the camera to horizontally and/or vertically sweep the selected geographic area, wherein the classifying of the one or more animals includes identifying a species and/or a sex for each of the one or more animals;

filtering the detected and classified one or more animals based on the species and/or sex of each of the one or more animals;

displaying a bounding region around each of the filtered and classified animals in the video data file to identify the one or more classified animals in the video data file;

storing selected discrete portions of the video data file in the memory, wherein each of the selected discrete portions include the bounding region of the one or more filtered and classified animals;

determining an animal location for the bounding region for each of the one or more filtered and classified animals for each of the selected discrete portions;

panning and/or tilting the camera to maintain the one or more filtered and classified animals in the field of view of the camera using the actuating unit; and tagging the selected discrete portions of the video data file with global positioning satellite metadata for each determined animal location for the filtered and classified animals so that each determined animal location is displayed on an aerial map.

2. The camera system in accordance with claim 1, wherein the image analysis module utilizes the processor to perform the additional step of:

tagging the selected discrete portion of the video data file with the identified species and/or the sex for each of the one or more animals.

3. The camera system in accordance with claim 2, further comprising a user interface module that is configured to receive a camera location including camera global positioning system data and a camera focal length, wherein the memory further includes a look-up table comprising average animal size data for a plurality of animal species, and wherein the processor is configured for calculating a size of an animal outline for each of the one or more animals;

comparing the calculated size of the respective animal outline with the look-up table size data for the identified species; and calculating a distance of the respective animal outline from the camera location, wherein the distance is converted to the global positioning satellite metadata.

4. The camera system in accordance with claim 3, wherein the image analysis module receives a camera azimuth angle and/or a camera elevation angle from the actuating unit prior to calculating the distance of the respective animal outline from the camera location, and wherein the camera azimuth angle and/or the camera elevation angle are used to calculate the location of each of the one or more animals.

5. The camera system in accordance with claim 3, wherein the processor is configured to:

display the aerial map identifying the camera location and the global positioning satellite metadata for each calculated animal location; and associate the identified species and/or sex for each of the one or more animals with its respective global positioning satellite metadata.

6. The camera system in accordance with claim 5, wherein the processor is further configured to display one or more of:

the selected discrete portion of the video;

each respective bounding region for each of the one or more animals;

the calculated size of each respective animal outline;

the calculated distance of each respective animal outline from the camera location;

the camera azimuth angle; and the camera elevation angle.

7. The camera system in accordance with claim 1, wherein the processor includes one or more of a central processing unit, a graphics processing unit, a field programmable gate array or neuromorphic hardware.

8. The camera system in accordance with claim 1, further including a device configured to measure an amount of camera tilt and/or an amount of camera pan.

9. The camera system in accordance with claim 1, further comprising a thermometer, wherein the selected discrete portion of the video data file is tagged to include temperature data determined by the thermometer.

10. The camera system in accordance with claim 1, wherein the camera is an optical camera and/or a thermal camera and/or a hypospectral camera.

11. The camera system in accordance with claim 1, further comprising a wind sensor configured to monitor wind speed and or wind direction, wherein the selected discrete portion of the video data file is tagged to include wind speed and/or wind direction data determined by the wind sensor.

12. The camera system in accordance with claim 1, wherein the camera system is in communication with a remote computing device through a network.

13. The camera system in accordance with claim 1, further comprising a user interface module, wherein the memory, the processor and the image analysis module are disposed in a remote computing device, wherein the remote computing device is in communication with the camera over a network, wherein the memory is configured to store the selected discrete portion of the video data file received from the camera system over the network, and wherein the image analysis module utilizes the processor to:

tag the selected discrete portion of the video data file with the identified species and/or sex for each of the detected one or more animals, and wherein the user interface module is configured to:

receive a camera location,
display the aerial map identifying the camera location and the global positioning satellite metadata for each calculated animal location, and
associate the identified species and/or sex for each of the one or more animals with its respective global positioning satellite metadata.

14. The camera system in accordance with claim 13, wherein an outline is provided for each of the one or more filtered and classified animals, and wherein the user interface module, utilizing the processor, is further configured to display one or more of:
the selected discrete portion of the video data file;
each respective bounding region for each of the filtered and classified one or more animals;
a calculated size of each respective animal outline; and
a calculated distance of each respective animal outline from the camera location.

15. The camera system in accordance with claim 1, wherein the camera system further includes a microphone configured to capture audio data, wherein the memory further includes a look-up table comprising animal sound data for a plurality of animal species and sexes, wherein the processing system further comprises:
an audio analysis module including computer executable instructions stored in the memory, wherein the audio analysis module utilizes the processor to perform the steps of:
receiving the captured audio data from the microphone;
storing the captured audio data in the memory as a sound data file;
performing an audio analysis of one or more discrete portions of the sound data file;
detecting at least one sound within each respective discrete portion of the sound data file;
comparing the detected at least one sound with the animal sound data in the look-up table to determine whether the detected sound is a detected animal sound;
storing a selected discrete portion of the sound data file in the memory, wherein the selected discrete portion includes at least one detected animal sound.

16. The camera system in accordance with claim 15, wherein the audio analysis module utilizes the processor to perform the additional steps of:
identifying a species and/or a sex of the animal as determined by the detected animal sound; and
tagging the selected discrete portion of the sound data file with the identified species and/or sex.

17. The camera system in accordance with claim 15, wherein the microphone is a directional microphone or an omnidirectional microphone.

18. A system for autonomously photographing wildlife comprising:
a camera system including:
a camera configured to capture video data in a selected geographic area, wherein the camera includes a field of view;
a camera mount configured to support the camera relative to a support surface;
an actuating unit coupling the camera to the camera mount, wherein the actuating unit is actuatable to tilt and/or pan the camera relative to the support surface;
a first memory configured for receiving the video data from the camera and storing the video data in a video data file;
a first processor for facilitating image analysis of the captured video data in the video data file, wherein the processor operates the actuating unit to pan and/or tilt the camera to horizontally and/or vertically sweet the selected geographic area; and
a first image analysis module stored in the first memory, wherein the first image analysis module includes computer executable instructions stored in the first memory, wherein the first image analysis module utilizes the first processor to perform the steps of:
receiving the video data file;
performing an image analysis of one or more discrete portions of the captured video data in the video data file; and
detecting and classifying one or more moving and stationary animals within at least one of the one or more discrete portions of the captured video data in the video data file using an object detection machine learning algorithm while the actuating unit is panning and/or tilting the camera to horizontally and/or vertically sweet the selected geographic area, wherein the classifying of the one or more animals includes identifying a species and/or a sex for each of the one or more animals;
filtering the detected and classified one or more animals based on the species and/or sex of each of the one or more animals; and
a remote computing system in communication with the camera system over a network, the remote computing system comprising:
a second memory configured for storing the one or more discrete portions of the captured video data in the video data file including the detected one or more animals communicated from the camera system;
a second processor;
a second image analysis module stored in the second memory, wherein the second image analysis module includes computer executable instructions stored in the second memory, wherein the second image analysis module utilizes the second processor to perform the steps of:
displaying a bounding region around each of the filtered and classified animals included in the one or more discrete portions of the captured video data in the video data file to identify the one or more classified animals in the video data file;
storing selected discrete portions of the video data file in the second memory, wherein each of the selected discrete portions include the bounding region of the one or more filtered and classified animals;
determining an animal location for the bounding region for each of the one or more filtered and classified animals for each of the selected discrete portions;
panning and/or tilting the camera to maintain the one or more filtered and classified animals in the field of view of the camera using the actuating unit; and
tagging the selected discrete portions of the video data file with global positioning satellite metadata for each determined animal location for the filtered and classified animals so that each determined animal location is displayed on an aerial map.

19. A method for autonomously photographing wildlife using a camera system configured to continuously record video data, the camera system including a camera including a field of view, a camera mount configured to support the camera relative to a support surface, an actuating unit coupling the camera to the camera mount, wherein the actuating unit is actuatable to tilt and/or pan the camera relative to the support surface, a memory, a processor, an image analysis module including computer executable instructions stored in the memory, the method, utilizing the processor, comprising the steps of:

provide video data from the camera in a selected geographic area;

storing the video data in the memory as a video data file;

performing an image analysis of one or more discrete portions of the video data file utilizing the image analysis module;

detecting and classifying one or more moving and stationary animals within one or more discrete portions of the video data file using an object detection machine learning algorithm while the actuating unit is panning and/or tilting the camera to horizontally and/or vertically sweep the selected geographic area, wherein the classifying of the one or more animals includes identifying a species and/or a sex for each of the one or more animals;

filtering the detected and classified one or more animals based on the species and/or sex of each of the one or more animals;

displaying a bounding region around each of the filtered and classified animals in the video data file to identify the one or more classified animals in the video data file;

storing selected discrete portions of the video data file in the memory, wherein each of the selected discrete portions include the bounding region of the one or more filtered and classified animals;

determining an animal location for the bounding region for each of the one or more filtered and classified animals for each of the selected discrete portions;

panning and/or tilting the camera to maintain the one or more filtered and classified animals in the field of view of the camera using the actuating unit; and tagging the selected discrete portions of the video data file with global positioning satellite metadata for each determined animal location for the filtered and classified animals so that each determined animal location is displayed on an aerial map.

20. The method in accordance with claim 19, further including the step of:

tagging the selected discrete portion of the video data file with the identified species and/or sex for each of the one or more detected animals.

21. The method in accordance with claim 20, wherein the memory further includes a look-up table comprising average animal size data for a plurality of animal species, and wherein the step of calculating a location of each of the one or more detected animals comprises:

receiving, via a user interface module, a camera location including camera global positioning system data;

receiving, via the user interface module, a camera focal length;

calculating a size of a respective animal outline using the processor;

comparing the calculated size of the respective animal outline with the look-up table size data for the identified species using the processor; and calculating a distance of the respective animal outline from the camera location, wherein the distance is converted to the global positioning satellite metadata.

22. The method in accordance with claim 21, wherein the step of calculating a location of each of the one or more detected animals further comprises:

receiving a camera azimuth angle and/or a camera elevation angle from the actuating unit prior to calculating a distance of the respective animal outline from the camera location.

23. The method in accordance with claim 22, further including the steps of:

displaying the aerial map identifying the camera location and the global positioning satellite metadata for each calculated animal location; and associating the identified species and/or sex for each of the one or more detected animals with its respective global positioning satellite metadata.

24. The method in accordance with claim 23, wherein the user interface module, utilizing the processor, is further configured to display one or more of:

the selected discrete portion of the video data file;

each respective bounding region for each of the one or more detected animals;

the calculated size of each respective animal outline;

the calculated distance of each respective animal outline from the camera location;

the camera azimuth angle; and the camera elevation angle.

25. The method in accordance with claim 19, further including the step of:

communicating with a remote computing device through a network, wherein the remote computing device includes a memory, a user interface module, a processor, and an image analysis module, wherein the memory of the remote computing device is configured to store the selected discrete portion of the video data file received from the camera system through the network, and wherein the image analysis module of the remote computing device utilizes the processor of the remote computing device to:

tag the selected discrete portion of the video data file with the identified species and/or sex for each of the one or more detected animals, and wherein the user interface module of the remote computing device is configured to:

receive a camera location, display the aerial map identifying the camera location and the global positioning satellite metadata for each calculated animal location, and associate the identified species and/or sex for each of the one or more detected animals with its respective global positioning satellite metadata.

26. The method in accordance with claim 25, wherein the user interface module of the remote computing device, utilizing the processor of the remote computing device, is further configured to display one or more of:

the selected discrete portion of the video data file;

each respective bounding region for each of the filtered and classified animals;

a calculated size of an animal outline for each of the one or more detected animals; and a calculated distance of each respective animal outline from the camera location.

27. The method in accordance with claim 19, wherein the camera system further includes a microphone configured to continuously record audio data, wherein the memory further includes a look-up table comprising animal sound data for a plurality of animal species and sexes, wherein an audio analysis module including computer executable instructions is stored in the memory, wherein the method, via the audio analysis module utilizing the processor, further includes the steps of:

receiving a sound data file;

performing an audio analysis of one or more discrete portions of the sound data file;

detecting at least one sound within each respective discrete portion of the video data file;

comparing the detected at least one sound with the look-up table animal sound data to determine whether the detected at least one sound is a detected animal sound; and storing a selected discrete portion of the sound data file in the memory, wherein the selected discrete portion includes at least one detected animal sound.

28. The method in accordance with claim 27, wherein the method further includes the steps of:

identifying, via the audio analysis module utilizing the processor, a species and/or a sex of the animal as determined by the detected animal sound; and tagging the selected discrete portion of the sound data file with the identified species and/or sex.

29. The method in accordance with claim 27, wherein the microphone is a directional microphone or an omnidirectional microphone.

30. The camera system in accordance with claim 1, wherein each animal location is identified with a pin on the aerial map, and wherein each pin includes an indicia that is representative of the species and/or sex of the one or more filtered and classified animals.

31. The camera system in accordance with claim 30, wherein the image analysis module utilizes the processor to perform the additional steps of:

selecting one of the pins displayed on the aerial map utilizing an input device; and in response to the selection of one of the pins, displaying the one or more discrete portions of the captured video data including the one or more filtered and classified animals and bounding region associated with the selected pin.

* * * * *